(12) United States Patent
Chitiveli et al.

(10) Patent No.: US 9,372,919 B2
(45) Date of Patent: *Jun. 21, 2016

(54) GENERATING VISUALIZATIONS OF A DISPLAY GROUP OF TAGS REPRESENTING CONTENT INSTANCES IN OBJECTS SATISFYING A SEARCH CRITERIA

(71) Applicant: International Business Machines Corporation, Armonk, NY (US)

(72) Inventors: Srinivas V. Chitiveli, Bangalore (IN); Barton W. Emanuel, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/559,822

(22) Filed: Dec. 3, 2014

(65) Prior Publication Data

US 2015/0142791 A1 May 21, 2015

Related U.S. Application Data

(63) Continuation of application No. 13/463,318, filed on May 3, 2012, now Pat. No. 8,954,428, which is a continuation of application No. 13/397,596, filed on Feb. 15, 2012, now abandoned.

(51) Int. Cl.
*G06F 17/00* (2006.01)
*G06F 17/30* (2006.01)
*G06F 17/24* (2006.01)

(52) U.S. Cl.
CPC .... *G06F 17/30696* (2013.01); *G06F 17/30991* (2013.01); *G06F 17/241* (2013.01)

(58) Field of Classification Search
None
See application file for complete search history.

(56) References Cited

U.S. PATENT DOCUMENTS 7,228,302 B2 6/2007 Kuchinsky et al.
7,305,390 B2 * 12/2007 Bowman ........... G06F 17/30675
(Continued)

FOREIGN PATENT DOCUMENTS

CN 101963966 A 2/2011
CN 102279872 A 12/2011
(Continued)

OTHER PUBLICATIONS

Beavan, D., "ComPair: Compare and Visualise the Usage of Language", [online], [Retrieved on Jan. 23, 2012]. Retrieved from the Internet at: <URL: http://dh2011abstracts.stanford.edu/xtf/view?docId=tei/ab-309.xml;query=; brand=default>, Digital Humanities 2011: Jun. 19-22, Total 2 pp.
(Continued)

*Primary Examiner* — Hung Le
(74) *Attorney, Agent, or Firm* — David W. Victor; Konrad, Raynes, Davda & Victor LLP

(57) ABSTRACT

Provided are a computer program product, method, and system for rendering search results. A search request is received having a search criteria to perform with respect to objects having content instances. A determination is made of the objects having qualifying content instances that satisfy the search criteria, an attribute value of the qualifying content instances for a specified attribute, and appearance settings for the qualifying content instances based on the determined attribute values. The appearance settings vary based on the attribute values. Tags are generated indicating the content instances and appearance settings for the content instances. A visualization of the tags in a display group are generated to provide visualization of the qualifying content instances in the objects according to the appearance settings, wherein visualizations of the tags is varied based on the determined appearance settings.

20 Claims, 30 Drawing Sheets

(56) References Cited

U.S. PATENT DOCUMENTS

| | | | |
|---|---|---|---|
| 7,437,370 | B1 | 10/2008 | Ershov |
| 7,475,072 | B1 | 1/2009 | Ershov |
| 7,493,319 | B1 | 2/2009 | Dash et al. |
| 7,529,743 | B1 | 5/2009 | Ershov |
| 7,580,719 | B2 | 8/2009 | Karmarkar |
| 7,752,534 | B2 | 7/2010 | Blanchard, III et al. |
| 8,015,188 | B2 | 9/2011 | Gallivan et al. |
| 8,275,399 | B2 | 9/2012 | Karmarkar et al. |
| 8,756,527 | B2 | 6/2014 | Paasovaara |
| 2007/0094592 | A1 | 4/2007 | Turner et al. |
| 2008/0072145 | A1 | 3/2008 | Blanchard et al. |
| 2008/0104040 | A1 | 5/2008 | Ramakrishna |
| 2008/0231644 | A1 | 9/2008 | Lempel et al. |
| 2009/0093275 | A1* | 4/2009 | Oh .................. G06F 3/0482 455/566 |
| 2009/0094190 | A1 | 4/2009 | Stephens |
| 2009/0094629 | A1 | 4/2009 | Lee et al. |
| 2009/0182727 | A1* | 7/2009 | Majko ............. G06F 17/30867 |
| 2009/0187846 | A1 | 7/2009 | Paasovaara |
| 2009/0287676 | A1 | 11/2009 | Dasdan |
| 2009/0287889 | A1* | 11/2009 | Abts ................ G06F 11/106 711/154 |
| 2009/0299725 | A1 | 12/2009 | Grigsby et al. |
| 2010/0030552 | A1 | 2/2010 | Chen et al. |
| 2010/0070860 | A1* | 3/2010 | Alkov .............. G06F 17/3082 715/716 |
| 2010/0088726 | A1 | 4/2010 | Curtis et al. |
| 2010/0127994 | A1* | 5/2010 | Aono ............... G06F 3/04886 345/173 |
| 2010/0131899 | A1 | 5/2010 | Hubert |
| 2010/0174743 | A1* | 7/2010 | Komano .......... G06F 17/30398 707/769 |
| 2010/0229082 | A1 | 9/2010 | Karmarkar et al. |
| 2010/0241507 | A1 | 9/2010 | Quinn et al. |
| 2010/0250340 | A1 | 9/2010 | Lee et al. |
| 2010/0293270 | A1 | 11/2010 | Augenstein et al. |
| 2011/0029873 | A1 | 2/2011 | Eseanu et al. |
| 2011/0040562 | A1 | 2/2011 | Doyle et al. |
| 2011/0047145 | A1 | 2/2011 | Ershov |
| 2011/0137912 | A1 | 6/2011 | Ragusa et al. |
| 2011/0137921 | A1 | 6/2011 | Inagaki |
| 2011/0190035 | A1 | 8/2011 | Vanden Heuvel et al. |
| 2011/0196859 | A1 | 8/2011 | Mei et al. |
| 2011/0270937 | A1* | 11/2011 | Portilla ............. H04L 12/5885 709/206 |
| 2011/0276921 | A1 | 11/2011 | Long |
| 2011/0282855 | A1 | 11/2011 | Ronen et al. |
| 2011/0307482 | A1 | 12/2011 | Radlinski et al. |
| 2012/0005195 | A1* | 1/2012 | Cain, Jr. ........... G06F 17/30734 707/722 |
| 2012/0030232 | A1 | 2/2012 | John et al. |
| 2012/0030244 | A1 | 2/2012 | John et al. |
| 2012/0030368 | A1 | 2/2012 | John et al. |
| 2012/0084149 | A1 | 4/2012 | Gaudiano et al. |
| 2012/0167010 | A1 | 6/2012 | Campbell et al. |
| 2012/0200567 | A1 | 8/2012 | Mandel et al. |
| 2013/0007661 | A1* | 1/2013 | Klappert ........... G06Q 30/02 715/811 |
| 2013/0084149 | A1 | 4/2013 | Ngo |
| 2013/0173533 | A1* | 7/2013 | Nichols ............ G06F 17/30035 707/609 |
| 2013/0212087 | A1 | 8/2013 | Chitiveli et al. |
| 2013/0253907 | A1 | 9/2013 | Castellanos et al. |

FOREIGN PATENT DOCUMENTS

| | | | |
|---|---|---|---|
| EP | 2136301 | A1 | 12/2009 |
| WO | 2011149454 | A1 | 12/2011 |

OTHER PUBLICATIONS

Beavan, D., "Glimpses through the Clouds: Collocates in a New Light", Digital Humanities 2008, Jun. 2008, Total 5 pp.

Cui, W., Y. Wu, S. Liu, F. Wei, and M.X. Zhou, "Context Preserving Dynamic Word Cloud Visualization", IEEE Pacific Visualization Symposium, Mar. 2-5, 2010, Total 8 pp. [Also pp. 121-128].

Exalead, "Exalead Blog—The Blog of Exalead", [online], [Retrieved on Oct. 21, 2011]. Retrieved from the Internet at: <URL: http://blog.exalead.com/2011/03/08/press-release-exalead-named-kmworld-100-companies-that-matter-for-sixth-straight-year>, Total 4 pp.

IBM, "Search and Text Analytics Collections in IBM Content Analytics", [online], [Retrieved on Jan. 20, 2012]. Retrieved from the Internet at: <URL: https://www-304.ibm.com/support/docview.wss?uid=swg27015654>, Total 4 pp.

IRIS, "Desktop IRIS Screenshots", [online], [Retrieved on Oct. 21, 2011]. Retrieved from the Internet at: <URL: http://www.irissearch.net/tour/desktop_screenshots1>, Total 1 p.

Kaptein, R., D. Hiemstra, and J. Kamps, "How Different are Language Models and Word Clouds?", University of Amsterdam, The Netherlands, ECIR 2010, LNCS 5993, Total 13 pp. [Also pp. 556-568].

Kaptein, R. and J. Kamps, "Word Clouds of Multiple Search Results", ACM Proceedings of The Second International Conference on Multidisciplinary Information Retrieval Facility, Jun. 2011, Total 16 pp.

Koutrika, G., Z.M. Zadeh, and H. Garcia-Molina, "Data Clouds: Summarizing Keyword Search Results over Structured Data", ACM EDBT, Saint Petersburg, Russia, Mar. 24-26, 2009, Total 12 pp.

Moran, M., "Listen to Your Customers to Adjust Your Keywords", [online], [Retrieved on Jan. 19, 2012]. Retrieved from the Internet at: <URL: http://www.searchengineguide.com/mike-moran/listen-to-your-customers-for-your-keywor.php>, © 1998-2012 K. Clough, Inc., Total 9 pp.

Rayson, P. and J. Mariani, "Visualising Corpus Linguistics", downloaded on Jan. 22, 2012 from ucrel.lancs.ac.uk/publications/cl2009/426_FullPaper.docx, Total 10 pp.

Wikipedia, "Tag Cloud", [online], [Retrieved on Jan. 20, 2012]. Retrieved from the Internet at: <URL: http://en.wikipedia.org/w/index.php?title_tag_cloud&printable=yes>, Total 6 pp.

Wordhoard, "Comparing Collocates", [online], [Retrieved on Jan. 23, 2012]. Retrieved from the Internet at <URL: http://wordhoard.northwestern.edu/userman/analysis-comparingcollocates.html>, Total 6 pp.

Zhu, W., A. Iwai, T. Leyba, J. Magdalen, K. McNeil, T. Nasukawa, N. Patel, and K. Sugano, "IBM Content Analytics Version 2.2: Discovering Actionable Insight from Your Content", May 2011, Total 698 pp.

U.S. Appl. No. 13/397,596, filed Feb. 15, 2012, entitled "Generating Visualizations of a Display Group of Tags Representing Content Instances in Objects Satisfying a Search Criteria", invented by S.V. Chitiveli and B.W. Emanuel, Total 33 pp. [57.255 (Appln)].

U.S. Appl. No. 13/1461,650, filed May 1, 2012, entitled "Generating Visualizations of Facet Values for Facets Defined Over a Collection of Objects", invented by Emanuel, B.W. and T. Leyba, Total 31 pp. [57.270 (Appln)].

Nguyen, T.T., K. Chang, and S.C. Hui, "Word Cloud Model for Text Categorization", ICDM 11th IEEE International Conference on Data Mining, © 2011 IEEE, Total 10 pp. [Also Dec. 11-14, 2011, pp. 487-496].

The New York Times Company, "Most Searched New York Times Articles in the Past 30 Days—The New . . . ", [online], [Retrieved on Mar. 6, 2012]. Retrieved from the Internet at <URL: http://www.nytimes.com/most-popular-searched?period=30&format=tag . . . >, Total 1 p.

English Abstract and Machine Translation for CN101963966A1, published on Feb. 2, 2011, Total 3 pp.

International Search Report & Written Opinion, Jul. 4, 2013, for PCT/IB2013/050754, Total 9 pp.

U.S. Publication No. 2011/0307482, dated Dec. 15, 2011, is an English language equivalent of CN102279872A.

Amendment 1, Mar. 4, 2013, for U.S. Appl. No. 13/397,596, filed Feb. 15, 2012 by S.V. Chitiveli et al., Total 13 pp. [57.255 (Amend1)].

Final Office Action 1, Jun. 4, 2013, for U.S. Appl. No. 13/397,596, filed Feb. 15, 2012 by S.V. Chitiveli et al., Total 13 pp. [57.255 (FOA1)].

Notice to File Corrected Application Papers, Mar. 2, 2012, for U.S. Appl. No. 13/397,596, filed Feb. 15, 2012 by S.V. Chitiveli et al., Total 2 pp. [57.255 (NFCAP)].

(56) References Cited

OTHER PUBLICATIONS

Response to Notice to File Corrected Application Papers, Mar. 29, 2012, for U.S. Appl. No. 13/397,596, filed Feb. 15, 2012 by S.V. Chitiveli et al., Total 34 pp. [57.255 (Rsp NFCAP)].
Office Action 1, Dec. 4, 2012, for U.S. Appl. No. 13/397,596, filed Feb. 15, 2012 by S.V. Chitiveli et al., Total 25 pp. [57.255 (OA1)].
Response to Final Office Action 1 for U.S. Appl. No. 13/397,596, dated Aug. 19, 2013, 10 pp. [57.255 (RFOA1)].
Notice of Allowance for U.S. Appl. No. 13/397,596, dated Oct. 22, 2013, 16 pp. [57.255 (NOA1)].
Preliminary Remarks, May 3, 2012, for U.S. Appl. No. 13/463,318, filed May 3, 2012 by S.V. Chitiveli et al., Total 1 p. [57.255C1 (PrelimRemarks)].
Office Action 1, Jan. 14, 2014, for U.S. Appl. No. 13/463,318, filed May 3, 2012 by S.V. Chitiveli et al., Total 38 pp. [OA1 (57.255C1)].
Final Office Action, Apr. 28, 2014, for U.S. Appl. No. 13/463,318, filed May 3, 2012 by S.V. Chitiveli et al., Total 16 pp. [57.255C1 (FOA)].
Response to Final Office Action 1, Jul. 28, 2014, for U.S. Appl. No. 13/463,318, filed May 3, 2012 by S.V. Chitiveli et al., Total 14 pp. [57.255C1 (RFOA1)].
Advisory Action, Aug. 6, 2014, for U.S. Appl. No. 13/463,318, filed May 3, 2012 by S.V. Chitiveli et al., Total 3 pp. [57.255C1 (AdvAct)].
Notice of Allowance, Sep. 25, 2014, for U.S. Appl. No. 13/463,318, filed May 3, 2012 by S.V. Chitiveli et al., Total 14 pp. [57.255C1 (NOA)].
Office Action 1, Mar. 14, 2014, for U.S. Appl. No. 13/461,650, filed May 1, 2012 by B.W. Emanuel et al., Total 37 pp. [OA1 (57.270)].
Response to Office Action 1, Jul. 16, 2014, for U.S. Appl. No. 13/461,650, filed May 1, 2012 by B.W. Emanuel et al., Total 16 pp. [57.270 (ROA1)].
Final Office Action 1, Oct. 23, 2014 for U.S. Appl. No. 13/461,650, filed May 1, 2012 by B.W. Emanuel et al., Total 32 pp. [57.270 (FOA1)].
Response to Final Office Action, Jan. 23, 2015, for Application No. 13/461,650, filed May 1, 2012 by B.W. Emanuel et al., Total 17 pp. [57.270 (RFOA)].
Office Action 3, Aug. 14, 2015, for Application No. 13/461,650, filed May 1, 2012 by B.W. Emanuel et al., Total 18 pp. [57.270 (OA3)].
Response to Office Action 3, Nov. 16, 2015, for Application No. 13/461,650, filed May 1, 2012 by B.W. Emanuel et al., Total 15 pp. [57.270 (ROA3)].

\* cited by examiner

Display Group Definition

Display Group Instance

Tag

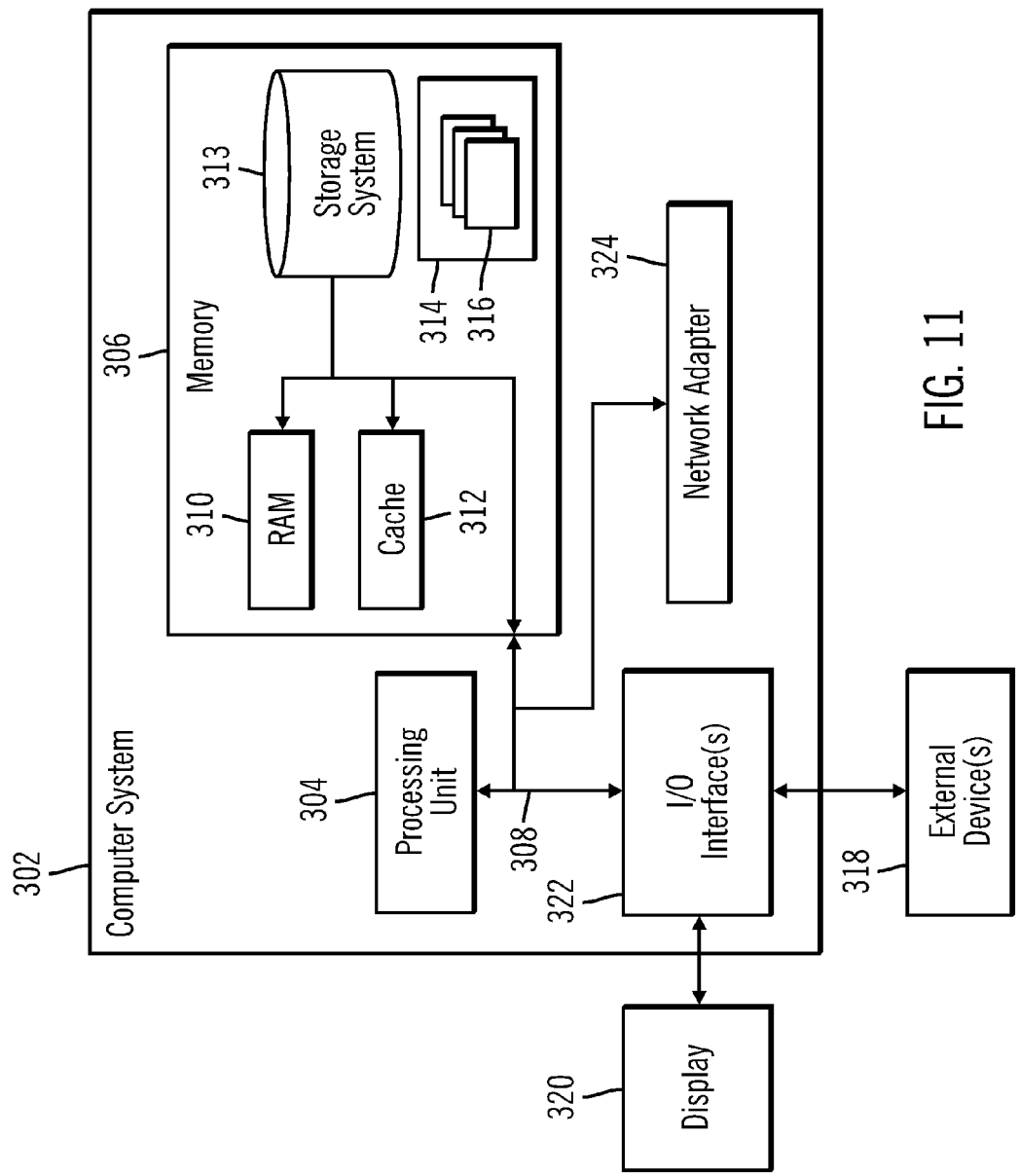

GENERATING VISUALIZATIONS OF A DISPLAY GROUP OF TAGS REPRESENTING CONTENT INSTANCES IN OBJECTS SATISFYING A SEARCH CRITERIA

CROSS-REFERENCE TO RELATED APPLICATIONS

This application is a continuation of U.S. patent application Ser. No. 13/463,318, filed May 3, 2012, which is a continuation of U.S. patent application Ser. No. 13/397,596, filed on Feb. 15, 2012, which patent applications are incorporated herein by reference in their entirety.

BACKGROUND OF THE INVENTION

1. Field of the Invention

The present invention relates to a computer program product, system, and method for generating visualizations of a display group of tags representing content instances in objects satisfying a search criteria.

2. Description of the Related Art

Search engines allow for searching of unstructured and structured content in objects and documents by indexing terms of the documents in an index associating the terms with the documents that have the terms. The search engine typically produces a list of search results including blocks of text including the text that satisfies the search request criteria. The user must visually scan the list to determine search results that are worth further pursuing by selection of the displayed result to access the document having the result.

There is a need in the art for improved techniques for presenting search results to users to optimize user efficiency when reviewing search results of unstructured and semi-structured content.

SUMMARY

Provided are a computer program product, method, and system for rendering search results. A search request is received having a search criteria to perform with respect to objects having content instances. A determination is made of the objects having qualifying content instances that satisfy the search criteria, an attribute value of the qualifying content instances for a specified attribute, and appearance settings for the qualifying content instances based on the determined attribute values. The appearance settings vary based on the attribute values. Tags are generated indicating the content instances and appearance settings for the content instances. A visualization of the tags in a display group are generated to provide visualization of the qualifying content instances in the objects according to the appearance settings, wherein visualizations of the tags is varied based on the determined appearance settings.

BRIEF DESCRIPTION OF THE DRAWINGS

Figure 9:
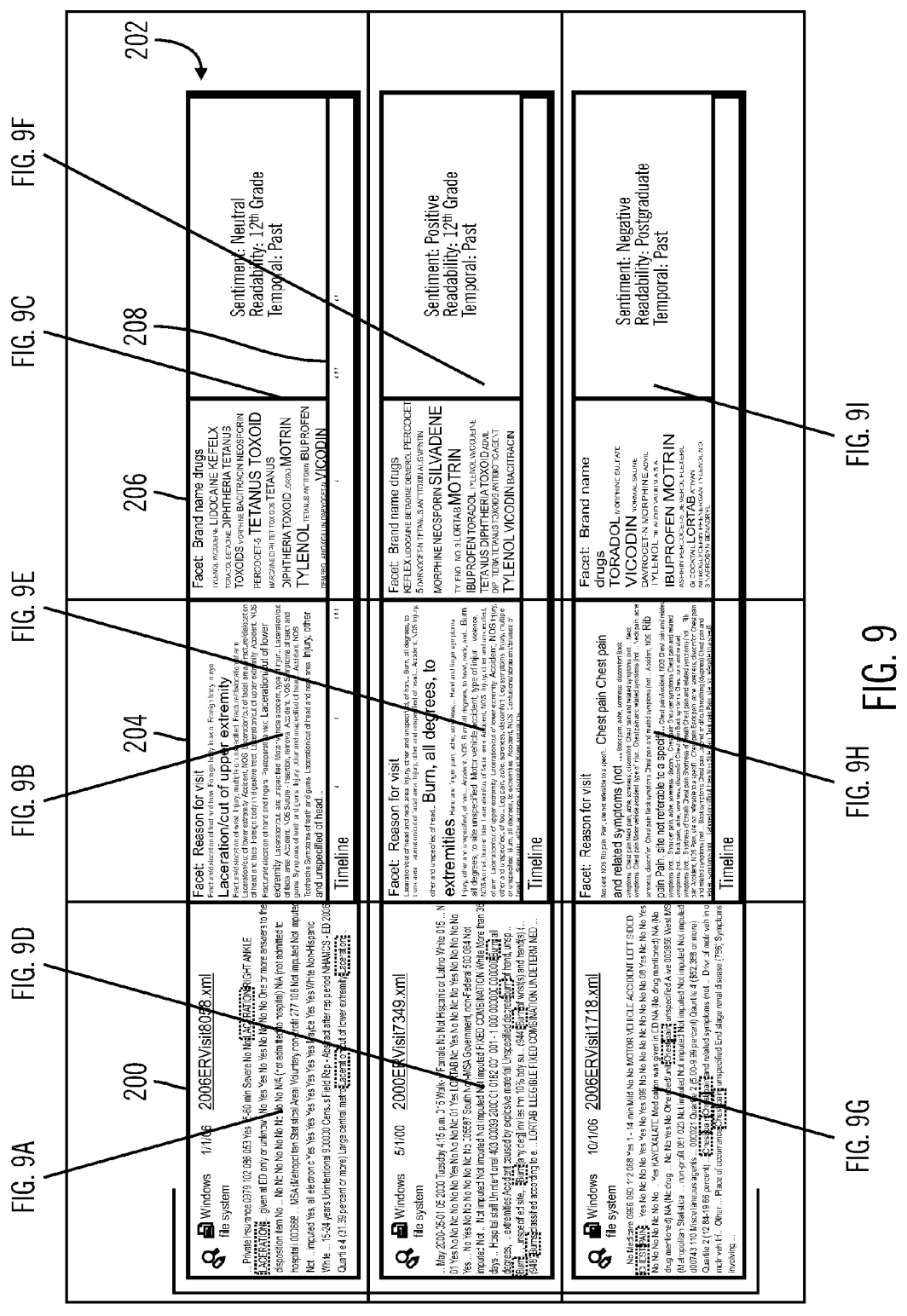
Figure 10:
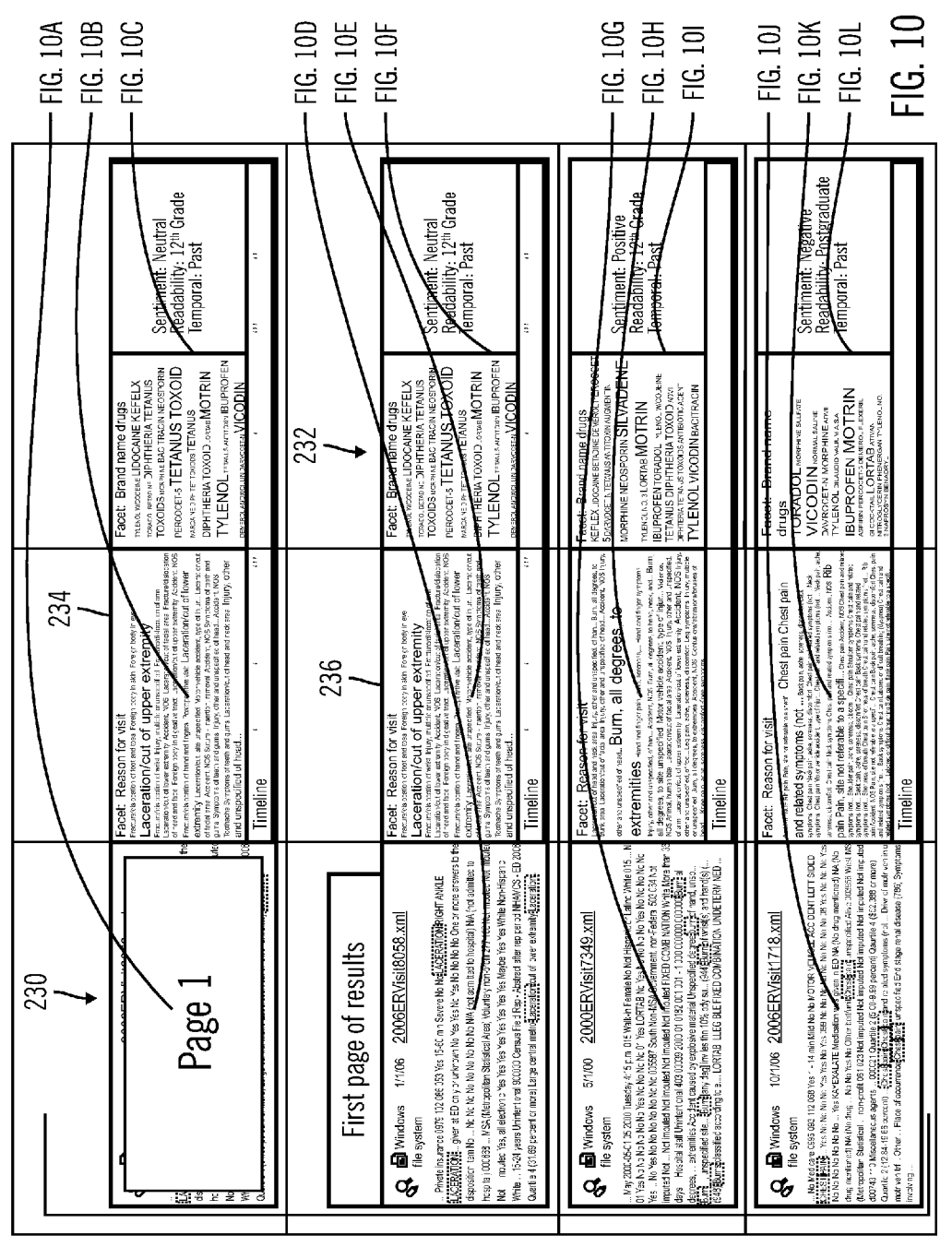

FIGS. 9 and 9A through 9I and FIGS. 10 and 10A-10L illustrate embodiments of generated display groups.

FIG. 11 illustrates an embodiment of a computing architecture.

DETAILED DESCRIPTION

Described embodiments provide techniques to generate display groups to display qualifying content instances from one or more objects that satisfy a search criteria based on an attribute of the qualifying content instances. The attribute used to determine how to display the qualifying content instances may indicate an attribute of the content instances themselves, such as their type, frequency, correlation to the search terms, etc. Additionally, the attribute may specify an annotation, so that the display group provides a visualization of tags representing qualifying content instances for qualifying content instances associated with the specified annotation. Further, tags visualized together in a display group may be from one or more objects.

Figure 1:
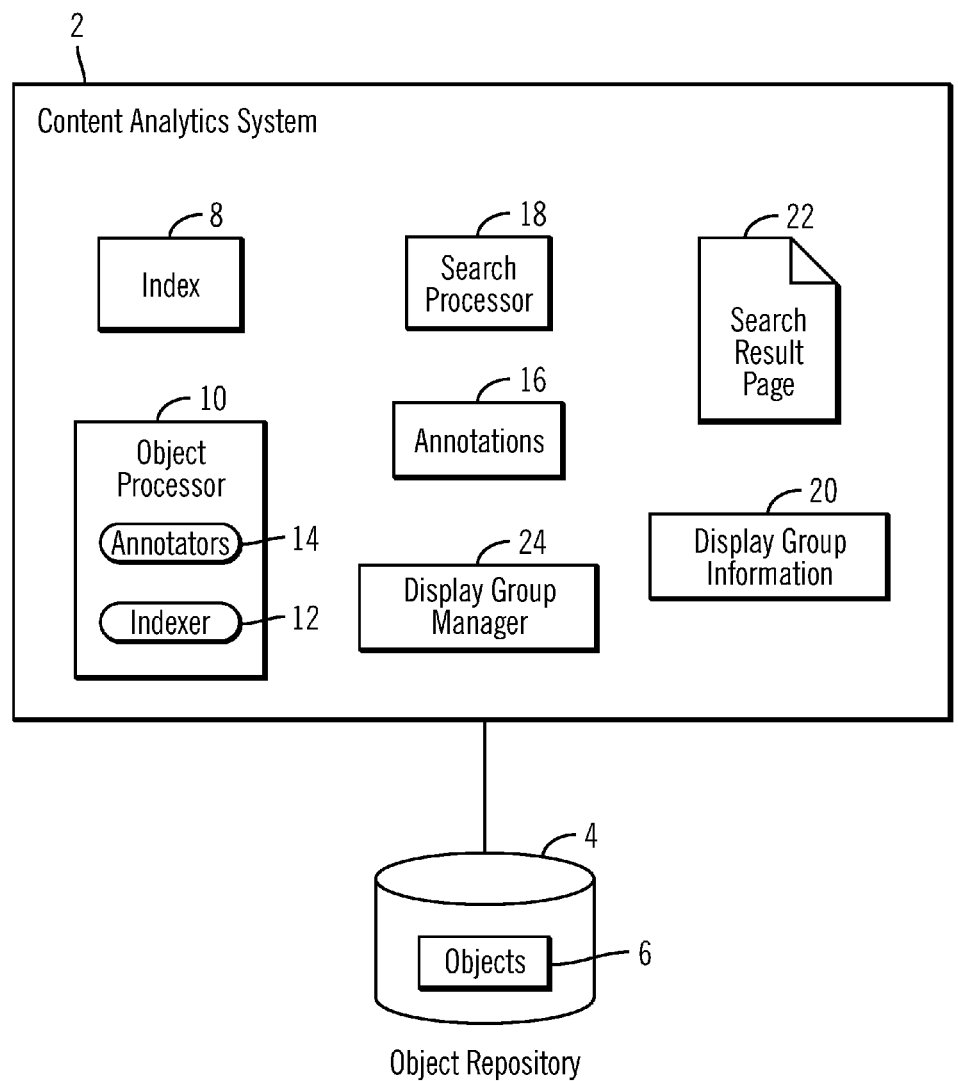
FIG. 1 illustrates a computing environment in which embodiments are implemented.

FIG. 1 illustrates an embodiment of a content analytics system 2 to provide an operating environment to process search requests from clients (not shown) for objects 6 maintained in a repository 4. The objects 6 may comprise textual documents, multi-media content with textual metadata, a database, and other data. The content analytics system 2 includes a search index 8 providing a listing of the content, such as words and text, in the objects 6. The index 8 may provide entries for terms and content in the objects 6 and indicate the objects 6 that include that indexed content.

An object processor 10 includes an indexer 12 to crawl the objects 6 to perform the indexing to generate the index 8. The object processor 10 may further include annotators 14 to apply text analytics to the objects 6 to generate annotations 16 providing additional information on the content of the objects 6. Text analytics provides techniques to convert textual data into structured data by extracting information from the text, e.g., person names, addresses, etc. and classifying content into categories based on the text. The object processor 10 may further generate facets providing components of information gleaned from the objects 6, which can be populated with information from structured fields or the text of the objects 6. The annotator 14 may comply with the Unstructured Information Management Architecture (UIMA), and include such annotators as a language identification annotator to identify the language of each object 6; a linguistic analysis annotator to apply linguistic analysis to the objects 6; a dictionary lookup annotator to match words and synonyms from a dictionary with words in the content of the objects 6 and to associate keywords with user-defined facets; a named entity recognition annotator to extract person names, locations, and company names;

A search processor 18 receives search requests from the client (not shown) and may determine objects 6 having content instances that satisfy the query. The search processor 81 may use the index 8 and annotations 16 to determine qualifying content instances, i.e., words or text, in the objects 6 to render as tags in a visualization of a display group, such as a word cloud. The search processor 18 may generate display group information 20 providing information on display groups of tags to generate together that share a common criteria, facets or annotations. A display group identifies tags to be visually presented together as a group, such as in a same display region of a graphical user interface (GUI), word cloud, panel, box, etc. The search processor 18 may construct a search result page 22 to present display groups including tags representing qualifying content.

The display group information 20 includes display group definitions (FIG. 2), display group instances (FIG. 3), and information on tags (FIG. 4) generated by the object processor 10, the display group manager 24 or some other component of the content analytics system 2. A display group manager 24 may be used to update the display group information 20 by allowing the user to define display groups and provide definitions on how to display tags, such as in a word cloud.

The repository 4 may comprise one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc. The components of the content analytics system 10, 18, and 24 may comprise software programs in a memory executed by a processor. In an alternative embodiment, some portion or all of the programs may be implemented in a hardware component, such as a dedicated integrated circuit, e.g., Application Specific Integrated Circuit (ASIC), expansion card, etc.

Figure 2:
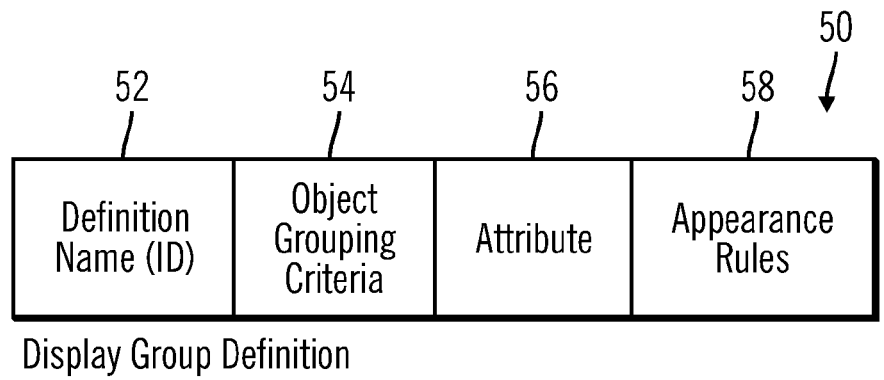
FIG. 2 illustrates an embodiment of a display group definition.

FIG. 2 illustrates an embodiment of a display group definition 50, including a definition name 52, an object grouping criteria 54 indicating a criteria used to define a group of one or more objects whose content instances will be visualized in the group 50; a specified attribute 56 that is used to determine which content instances will participate in the group for the objects identified in the object grouping criteria 54; and appearance rules 58 providing different appearance settings for different attribute 56 values. The object grouping criteria 54 may indicate that the display group is to be generated for only content instances for a single object or from a group of objects, such as one or more objects satisfying a search criteria, predefined number of objects satisfying the search criteria, a number of objects that would be listed on a search results page, etc. The attribute 56 used to vary the appearance of the tags may comprise a frequency of a qualifying content instance satisfying search criteria in the object, a correlation of the qualifying content instances to the search criteria; a degree to which the qualifying content instance makes the object different from content instances in other objects; a correlation of the qualifying content instance to an aggregation of search requests; and an extent to which the qualifying content instance comprises a proper name, address or other identifying information.

Further, the attribute 56 may indicate an annotation type or facet of the data that is used to discriminate among qualifying content instances to present in the display group 50. For instance, the specified attribute 56 may identify an annotation type so as to only include in the display group 50 qualifying content instances that are associated with the specified annotation type attribute. Examples of annotation types include a tone annotation indicating an author tone, sentiment (e.g., angry, sarcastic, humorous, tragic, etc.) of a context in which the qualifying content instances are used, such that the attribute values 58 used to vary the appearance settings comprise different tones of the context of the qualifying content instances, a frequency of a tone, or correlation of the tone to the search criteria; a noun phrase annotation identifying content instances used in forming noun phrases, where the attribute value 58 indicates a frequency of an occurrence of the qualifying content instances within noun phrases; a named entity annotation indicating qualifying content instances forming person names, organizations and locations, where the attribute values indicate a frequency of an occurrence of the named entity in the object; and a time based annotation indentifying qualifying content instances comprising time based information, wherein the attribute value indicates a chronological time of the qualifying content instance, and wherein the appearance settings indicate a display of the tag on a time line according to an ordering of the chronological times associated with the qualifying content instances. Other types of annotations may also be used to select qualifying content instances to visualize in the display group. Further, the attribute 56 may identify multiple annotations or attributes, to combine in the display group 50.

A user of the content analytics system 2 may utilize a GUI provided by the display group manager 22 to create one or more display group definitions 50 for different object grouping criteria 54 and attributes 56 to be applied to display search results in response to search requests from clients (not shown) with respect to the objects 6.

Figure 3:
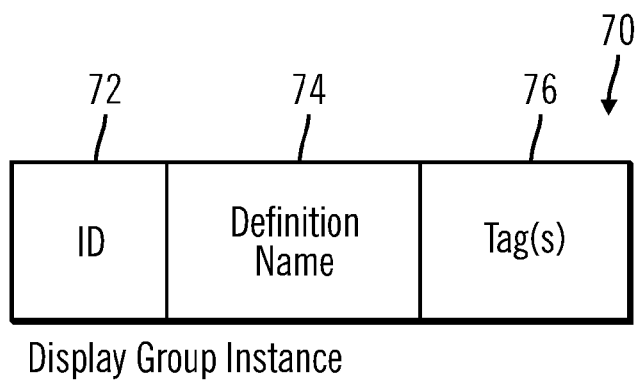
FIG. 3 illustrates an embodiment of a display group instance.

FIG. 3 illustrates an embodiment of a display group instance 70 comprising a particular instance of a display group formed according to one display group definition 50. A display group instance 70 includes an identifier 72 of the instance, a definition name 74 identifying a display group definition 50 from which the instance 70 was created, and one or more tags 76 representing qualifying content instances in object as selected according to the display group definition 74 for which the instance was created. The display group instances 70 maybe generated when processing search results returned for a search query.

Figure 4:
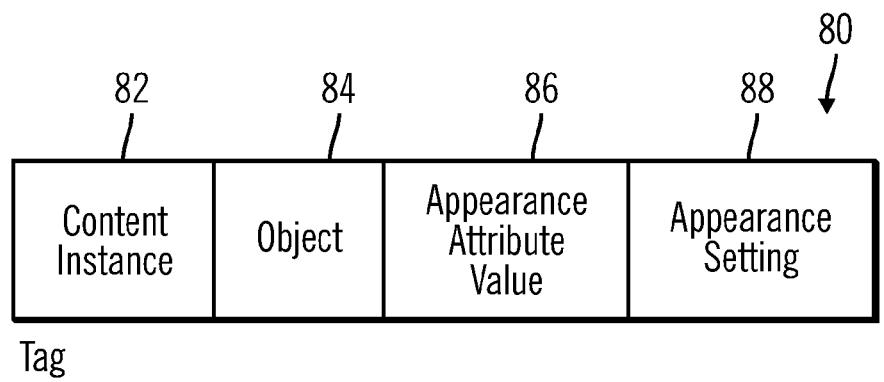
FIG. 4 illustrates an embodiment of a tag.
Figure 5:
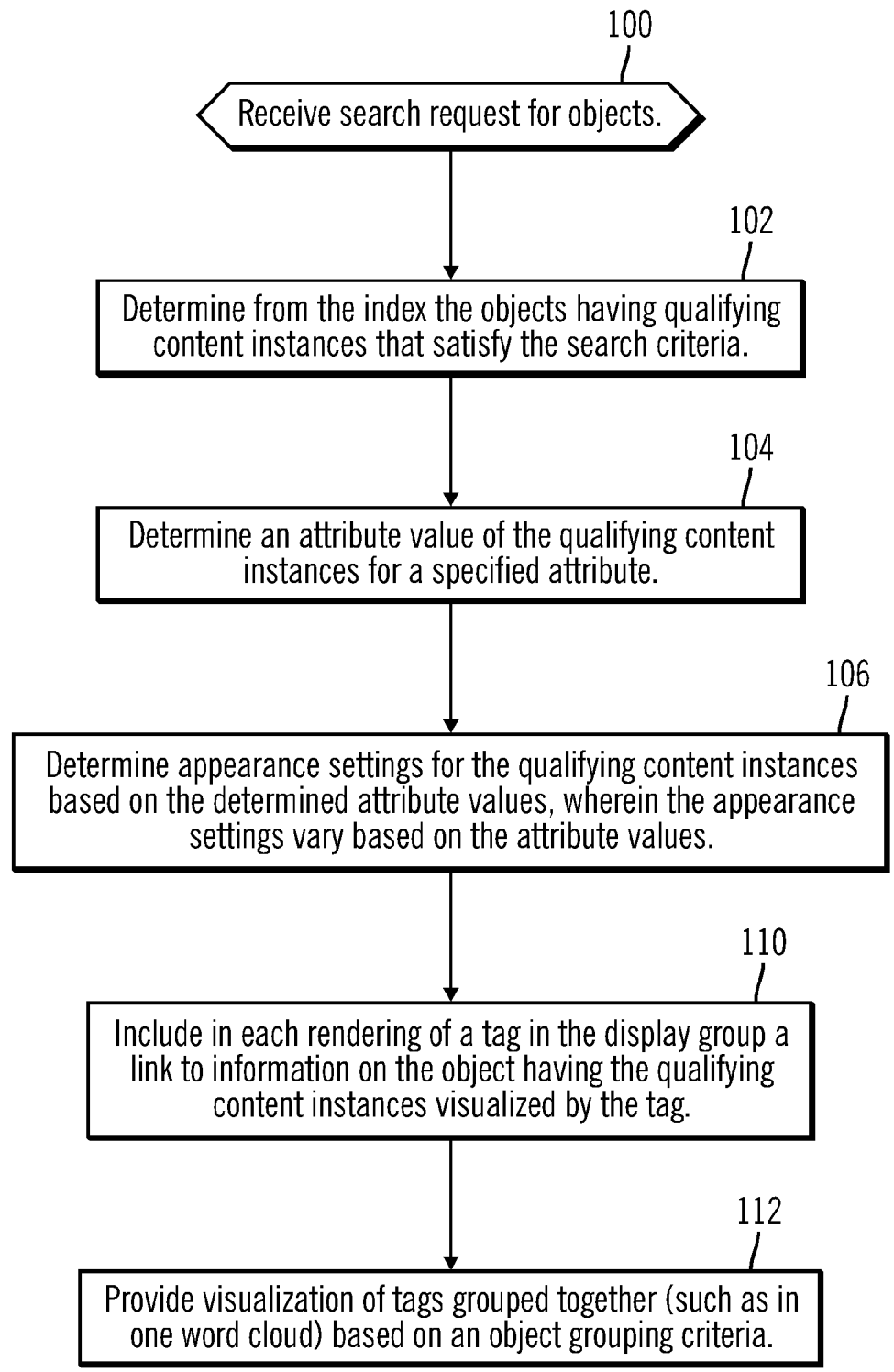
FIG. 5 illustrates an embodiment of operations to process a search request for objects.

FIG. 4 illustrates an embodiment of a tag 80, including a content instance 82, such as a text item; an object 84 including the content instance 82; an appearance attribute value 86 used to determine how the tag is to be displayed, and an appearance setting 88 indicating how the content instance 82 is to visually appear in the display group (e.g., word cloud), such as font size, color, font, boldness, etc. The appearance rules 58 may be used to determine the appearance setting 88 corresponding to the appearance attribute value 86 determined for the content instance. The appearance attribute value 86 may provide a value for the display attribute 56 for the display group for which the tag is being generated, such as a frequency of the content instance 82 in the object, a correlation of the content instance 82 to the search criteria, an annotation of the annotation type corresponding to the display attribute 56, etc.

FIGS. 5-8 illustrate embodiments of operations performed by components of the content analytics system 2, such as the object processor 10 and search processor 18 to process a search request to generate visualizations of display groups of tags. With respect to FIG. 5, upon the search processor 18 receiving (at block 100) a search request providing search criteria with respect to the objects 6 from a client (not shown), the search processor 18 determines (at block 102) from the index 8 the objects 6 having qualifying content instances that satisfy the search criteria. Qualifying content instances that satisfy the search criteria may comprise content that matches the search criteria, such as a word stem of the content matching a word stem of the search terms, and/or comprise content that is correlated to the search criteria, such as determined by using data mining and/or text mining techniques.

The search processor 18 determines (at block 104) an attribute value 86 of the qualifying content instances for the specified attribute 56, and may store this information in tags 80 created for the qualifying content instances. The search processor 18 determines (at block 106) appearance settings 88 for the qualifying content instances based on the determined attribute values 86, such that the appearance settings 88 may vary based on the determined attribute values 86. The search processor 18 may store this determined information in the tags 80 created for the qualifying content instances. The search processor 18 may generate (at block 110) with the rendering of the visualization of the tags in the display group links to information on the objects having the qualifying content instances visualized by the tags. The links may be to the object itself, or to a page of search results including the object having the qualifying content instance of the tag. The search processor 18 renders a visualization (at block 112) of tags grouped together (such as in one word cloud) based on an object grouping criteria, such as one object in the display group, a number of objects, such as a number of objects based on the number of results returned per page.

Figure 6:
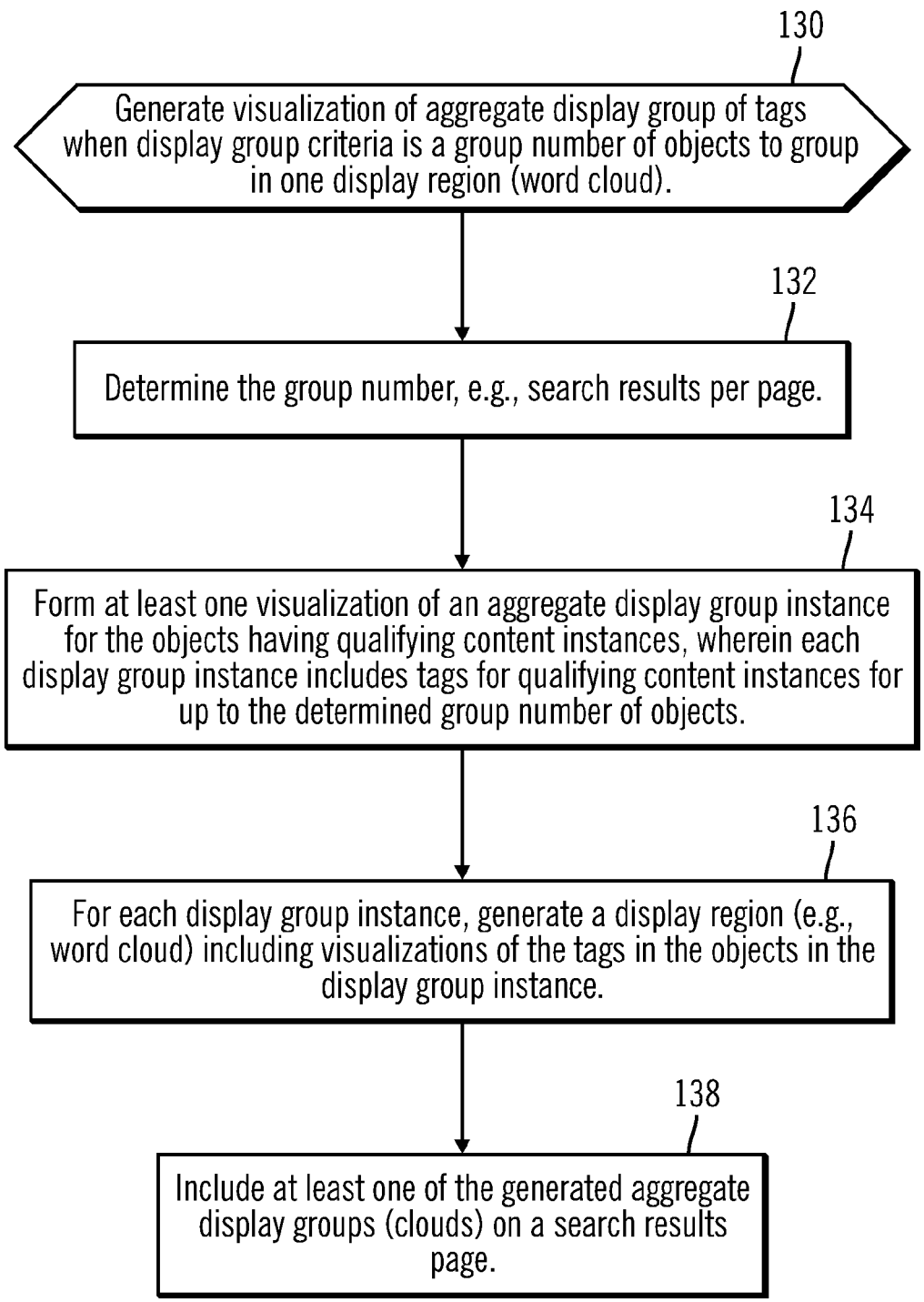
FIGS. 6, 7, and 8 illustrate embodiments of operations to generate visualizations of display groups of tags.

FIG. 6 illustrates an embodiment of operations performed by the search processor 16 or other component of the content analytics system 2 to generate a visualization of an aggregate display group of tags when the object grouping criteria is a group number of objects to group in one display region (e.g., a word cloud, panel, displayed shape, etc.). An aggregate display group aggregates tags from multiple objects to visualize in a single group. Upon initiating (at block 130) the operation to generate the display group, the search processor 18 determines (at block 132) the group number, such as a maximum number of search results per page. The search processor 18 forms (at block 134) at least one display group instance 70 for the objects having qualifying content instances, wherein each display group instance 70 includes tags 76 for qualifying content instances in groups for up to the determined group number of objects. For each display group instance, the search processor 18 generates (at block 136) a visualization of an aggregate display group (e.g., word cloud) including visualizations of the tags 76 in the objects in the display group instance. At least one of the generated aggregate display groups (clouds) may be included (at block 138) on a search result page 22 to return to the client that originated the search.

In certain embodiments, selection of the visualized aggregate display group instance may provide a link to a search result page providing information on the objects having content instances represented by tags in the visualized display group. In further embodiments, the visualized aggregate display group may not be on the search results page. Instead, there may be a page of visualized aggregate display groups which provide indexes to the search results represented by the visualized aggregate display groups. Alternatively, there may be visualized aggregate display groups on the search results page for the search results in previous and next pages, linked to those pages, to serve as a visual means of determining if the user wants to go to the next (or previous) page. There may be further visualized aggregates of the aggregates to provide further visual abstractions.

Figure 7:
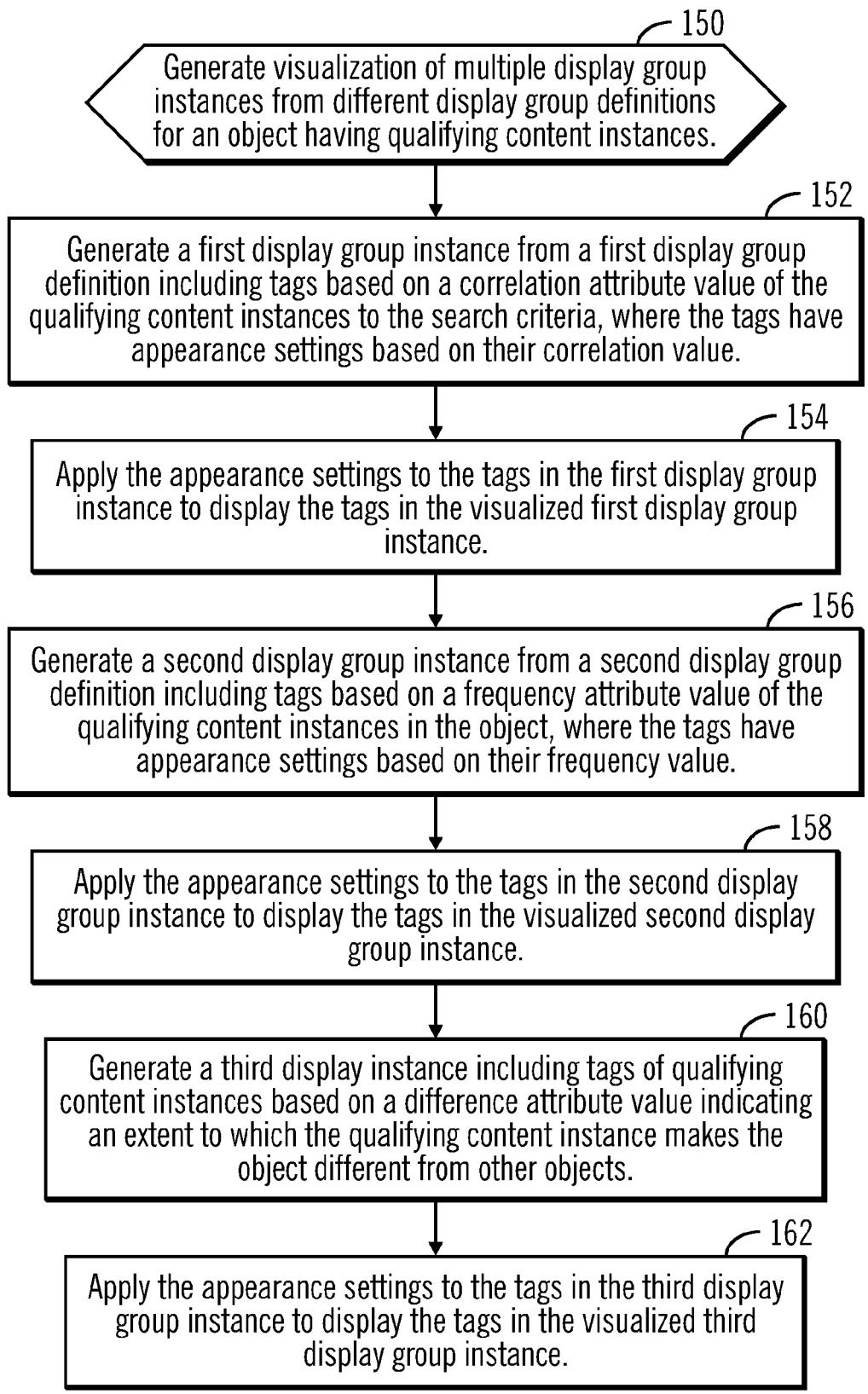

FIG. 7 illustrates an embodiment of operations performed by the search processor 18 or other component of the content analytics system 2 to generate display group instances 70 for multiple display group definitions 50 for an object having qualifying content instances satisfying the search criteria. Upon initiating (at block 150) the operation to generate display group instances, the search processor 18 generates (at block 152) a first display group instance 70 from a first display group definition 50, specifying a correlation display attribute 56, including tags based on a correlation attribute value of the qualifying content instances to the search criteria. The tags 76 may have appearance settings 88 based on their correlation value to the search criteria, e.g., content instances having stronger correlation to the search criteria are displayed with a more prominent or different appearance than those content instances having weaker correlation. The search processor 18 applies (at block 154) the appearance settings 88 of the tags 78 in the first display group instance to display the tags in the visualized first display group. The search processor 18 generates (at block 156) a second display group instance 70 from a second display group definition 50 including tags 76 based on a frequency attribute value of the qualifying content instances in the object. The tags for the second display group may have appearance settings based on their frequency value. The appearance settings 88 are applied (at block 158) to the tags 76 in the second display group instance 70 to display the tags in the visualized second display group. The search processor 18 may further generate (at block 160) a third display instance 70 including tags 76 of qualifying content instances 82 based on a difference attribute value indicating an extent to which the qualifying content instance 82 makes the object in which the content is included different from other objects, according to a scope, where scope can be varied between the page, all pages or entire set or collection of objects. The appearance settings 88 are applied (at block 162) to the tags 76 in the third display group instance to display the tags in the visualized third display group instance.

Figure 8:
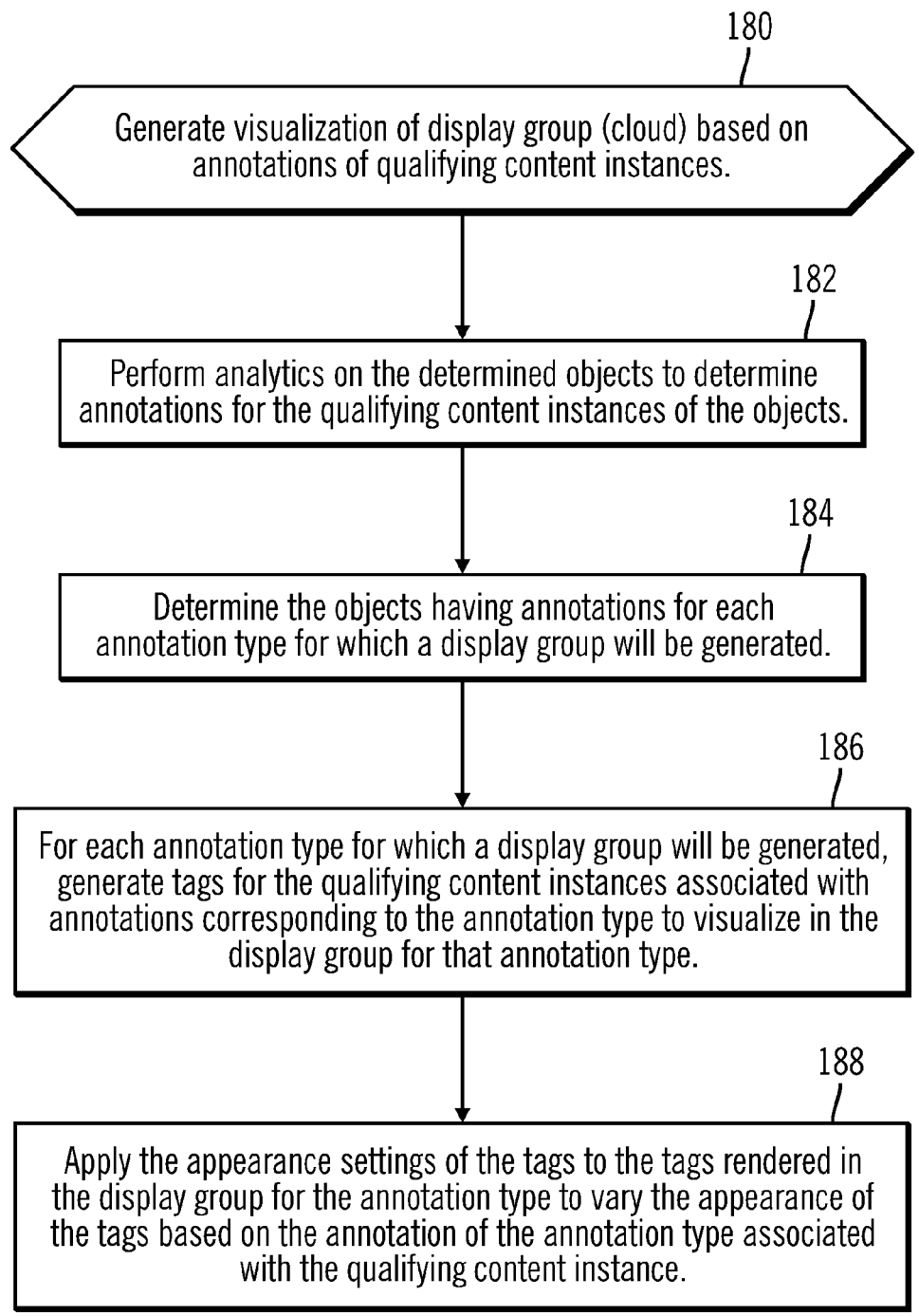
Figure 9A:
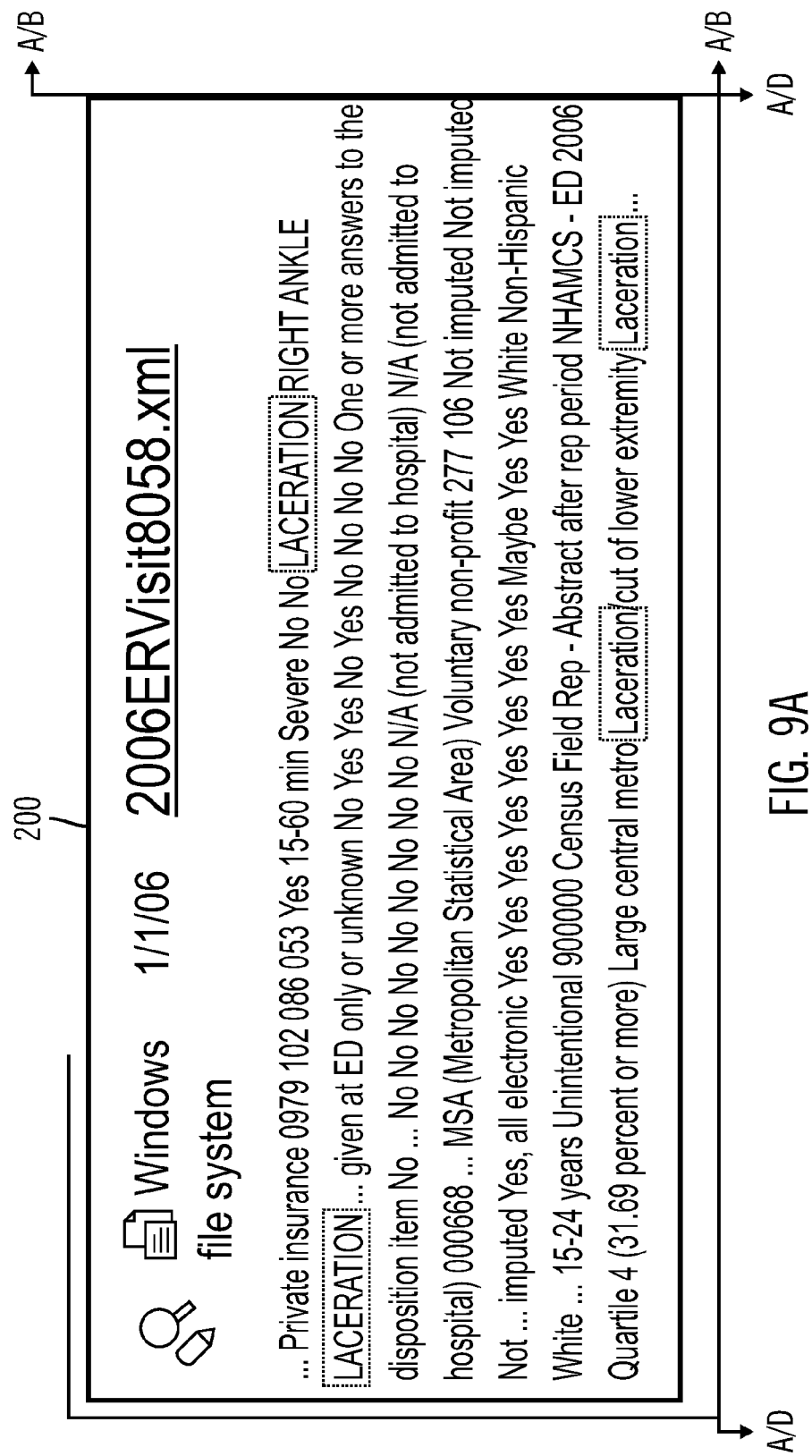
Figure 9B:
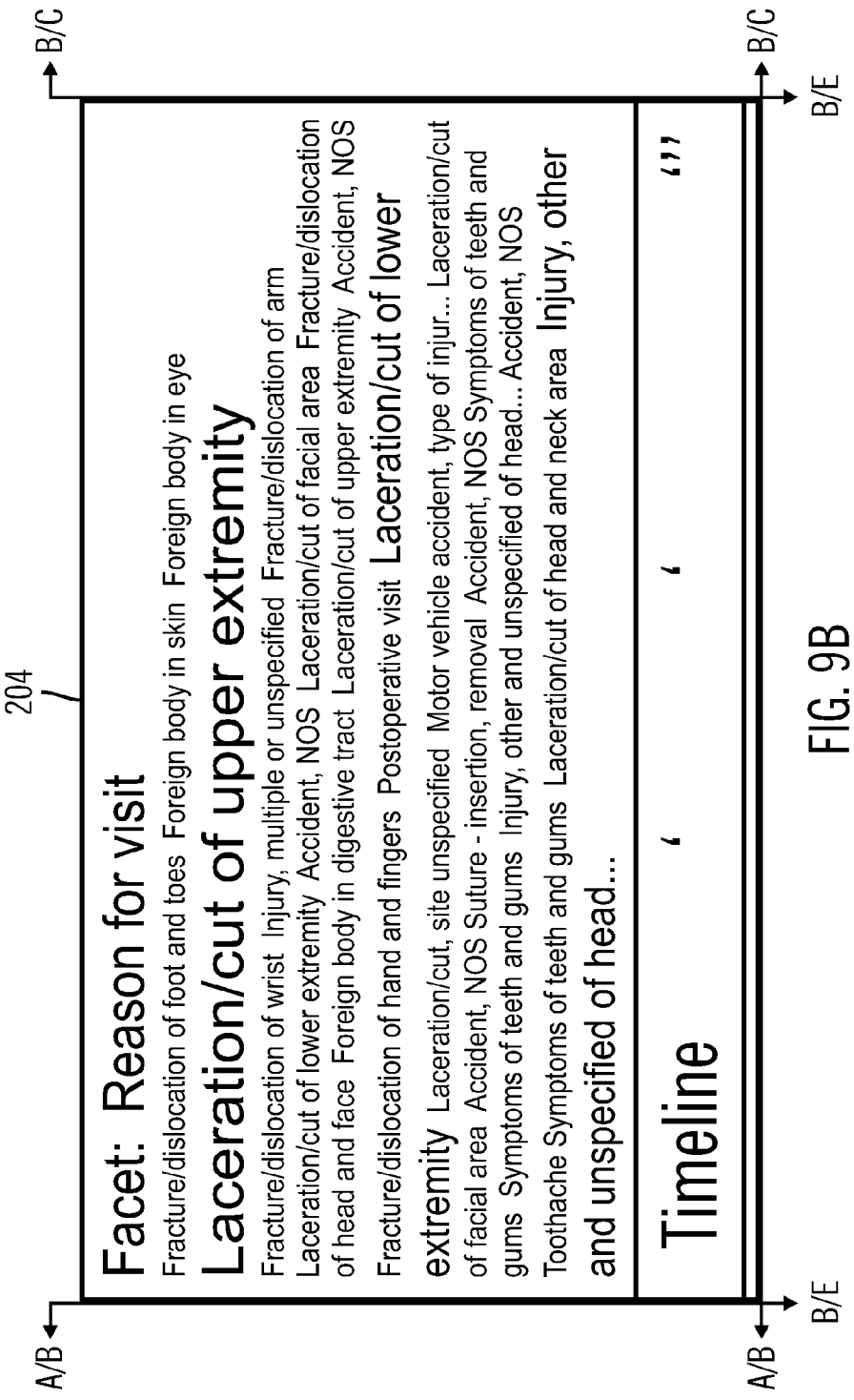
Figure 9C:
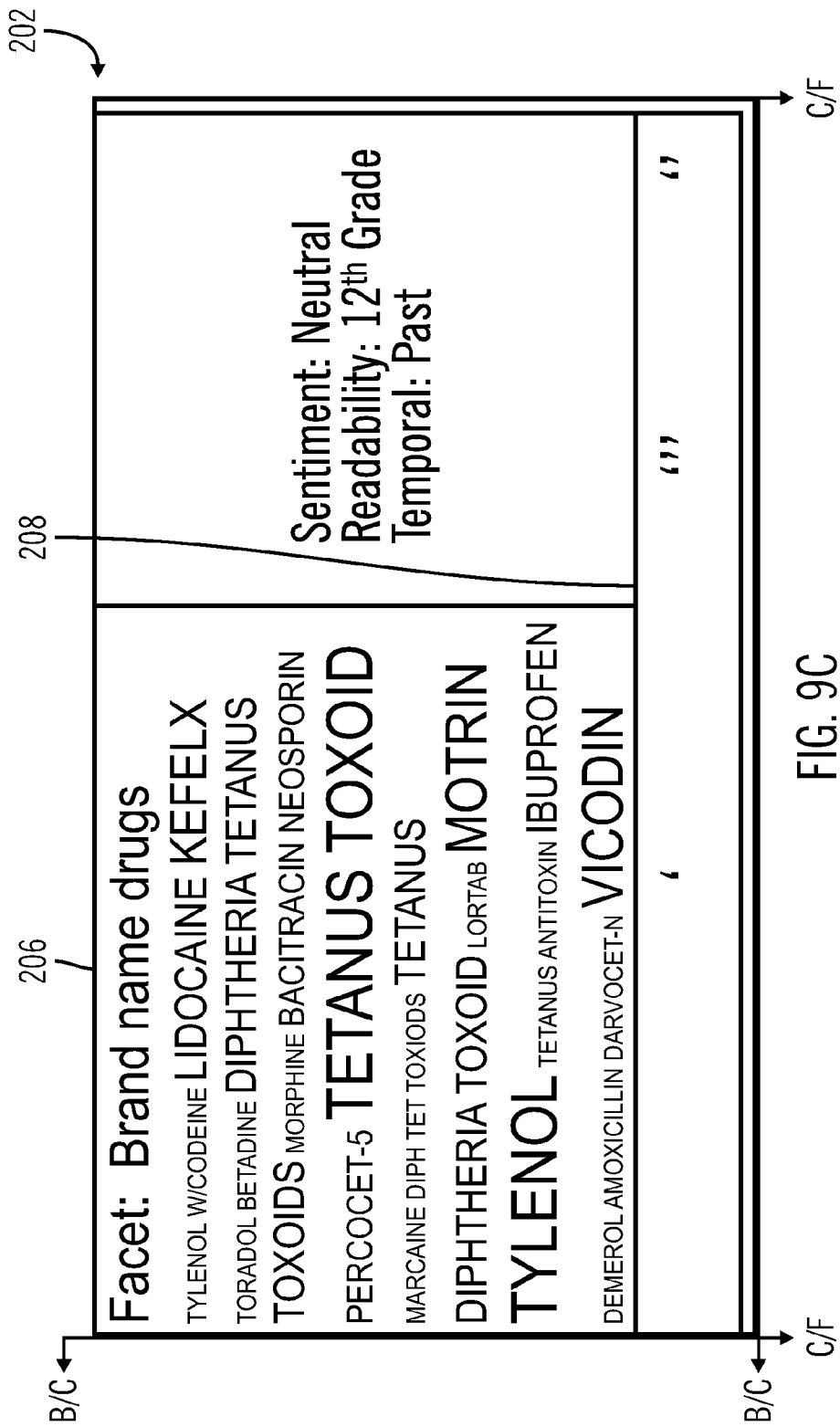
Figure 9D:
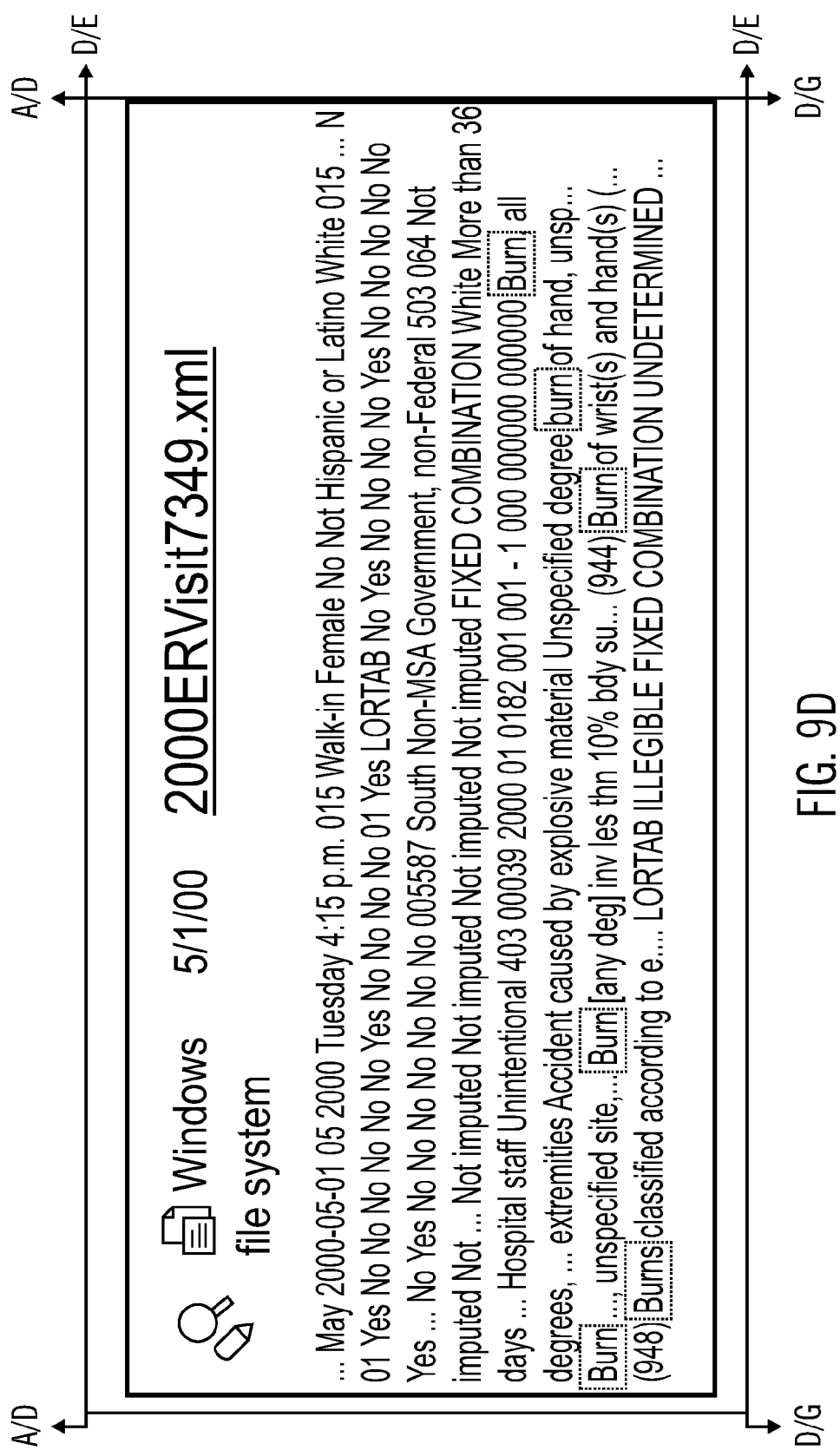
Figure 9E:
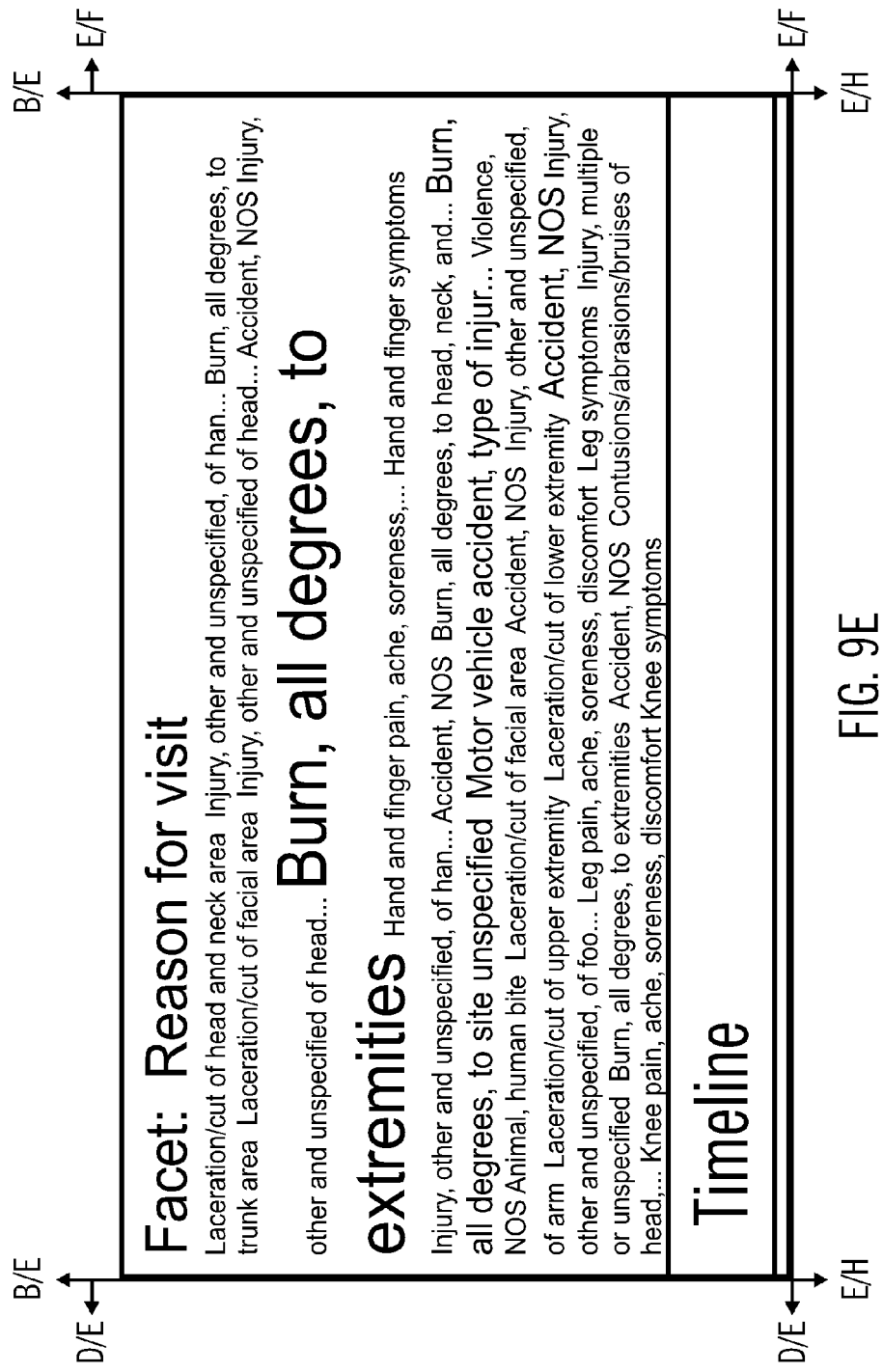
Figure 9F:
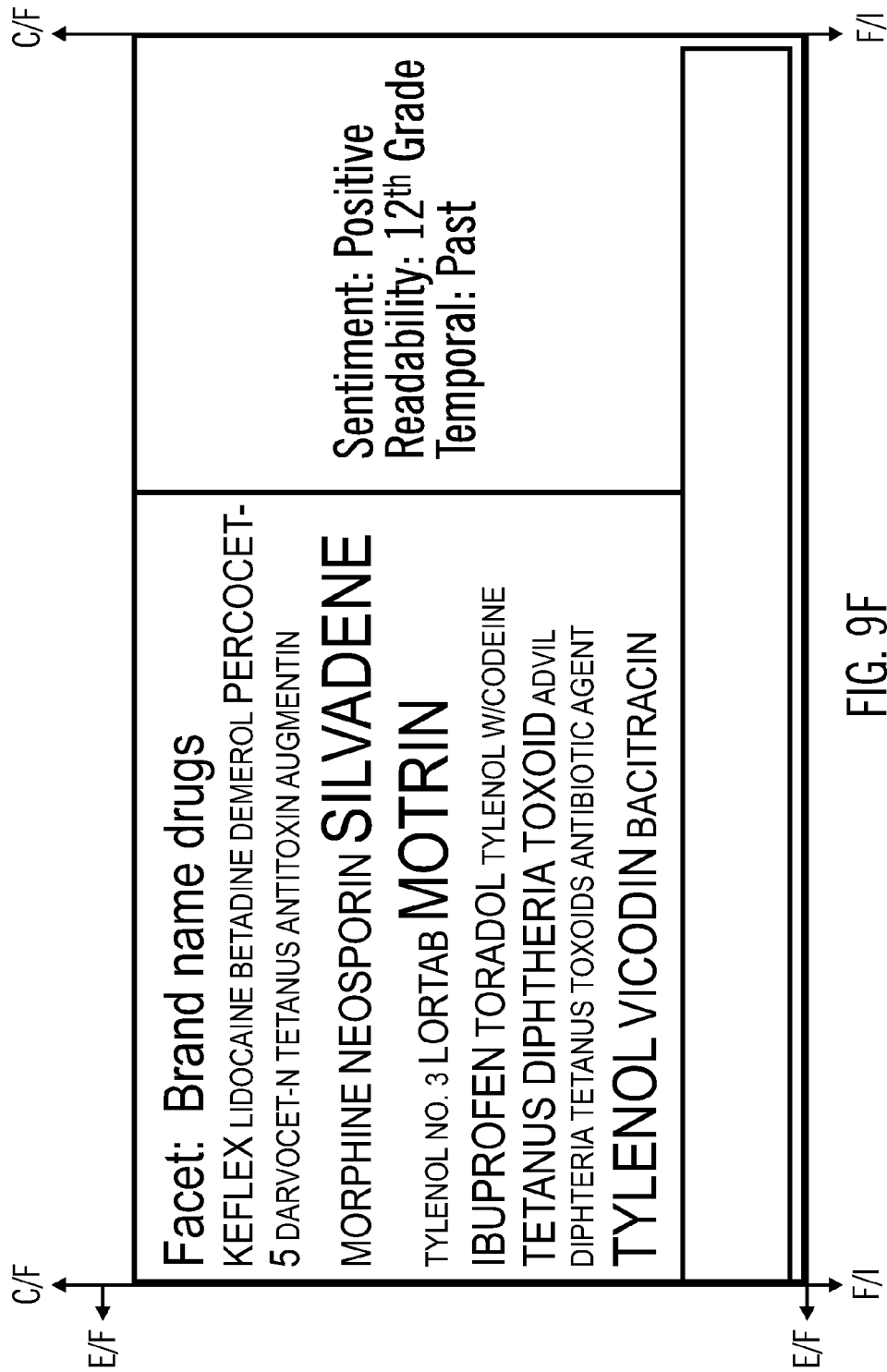
Figure 9G:
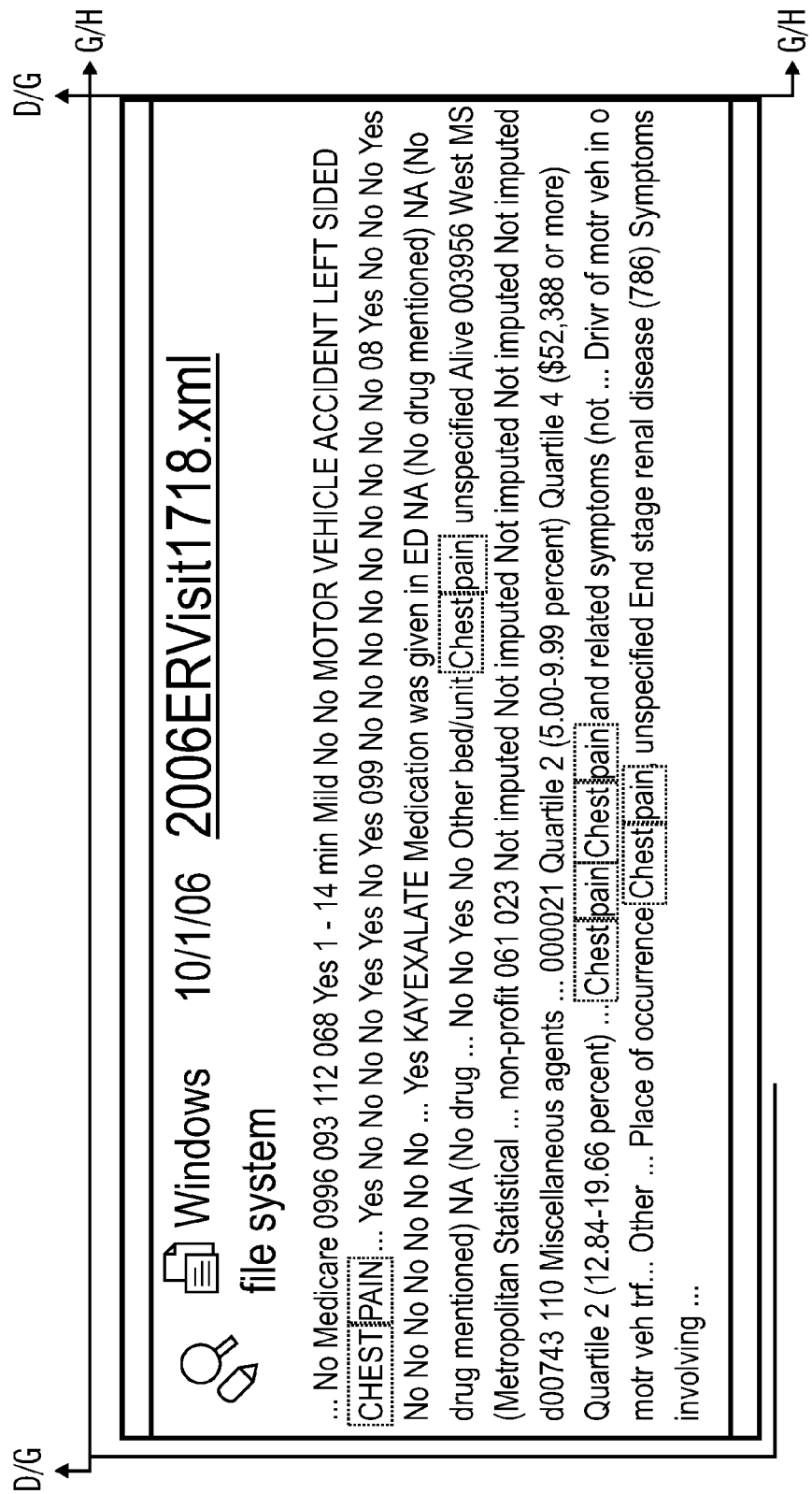
Figure 9H:
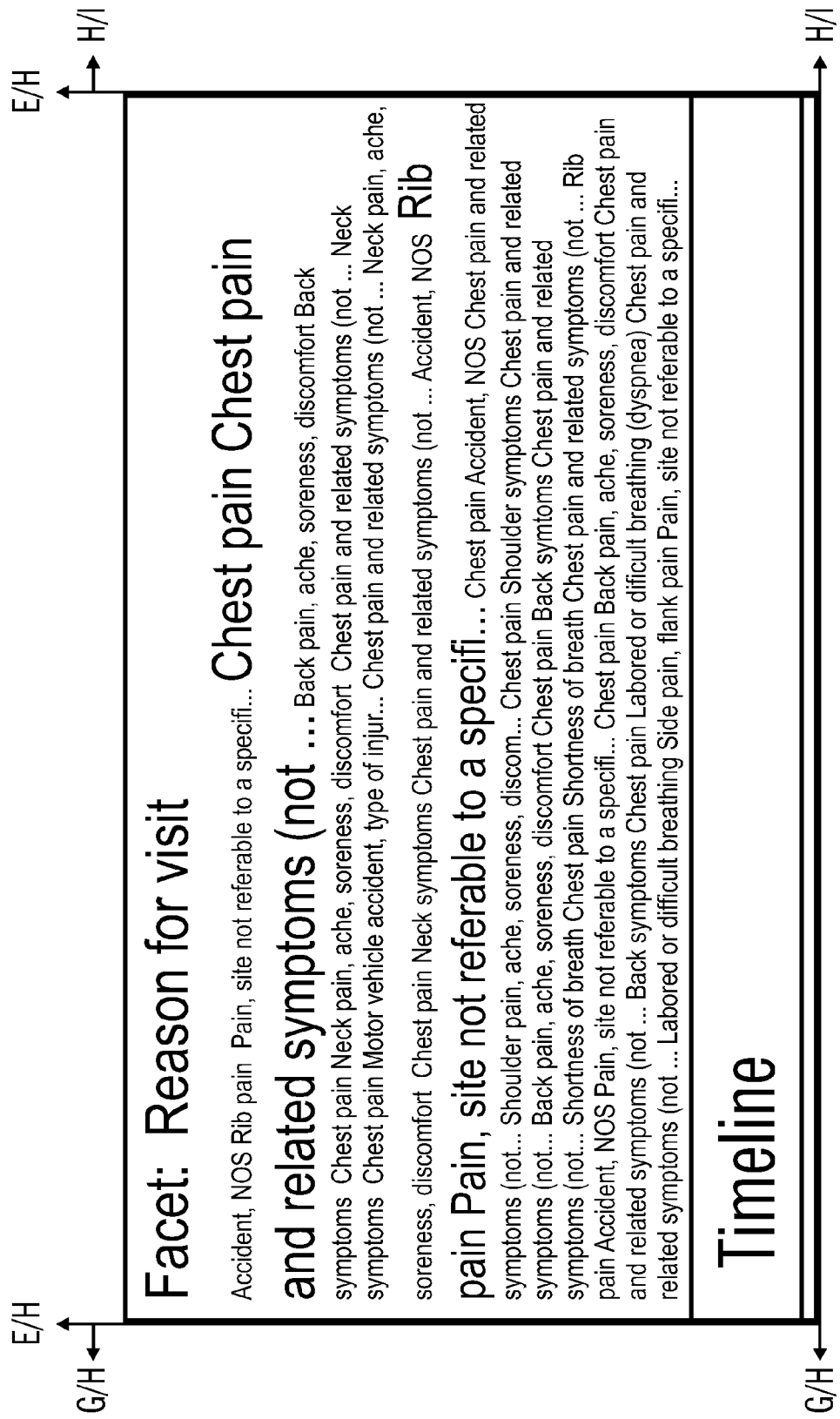
Figure 9I:
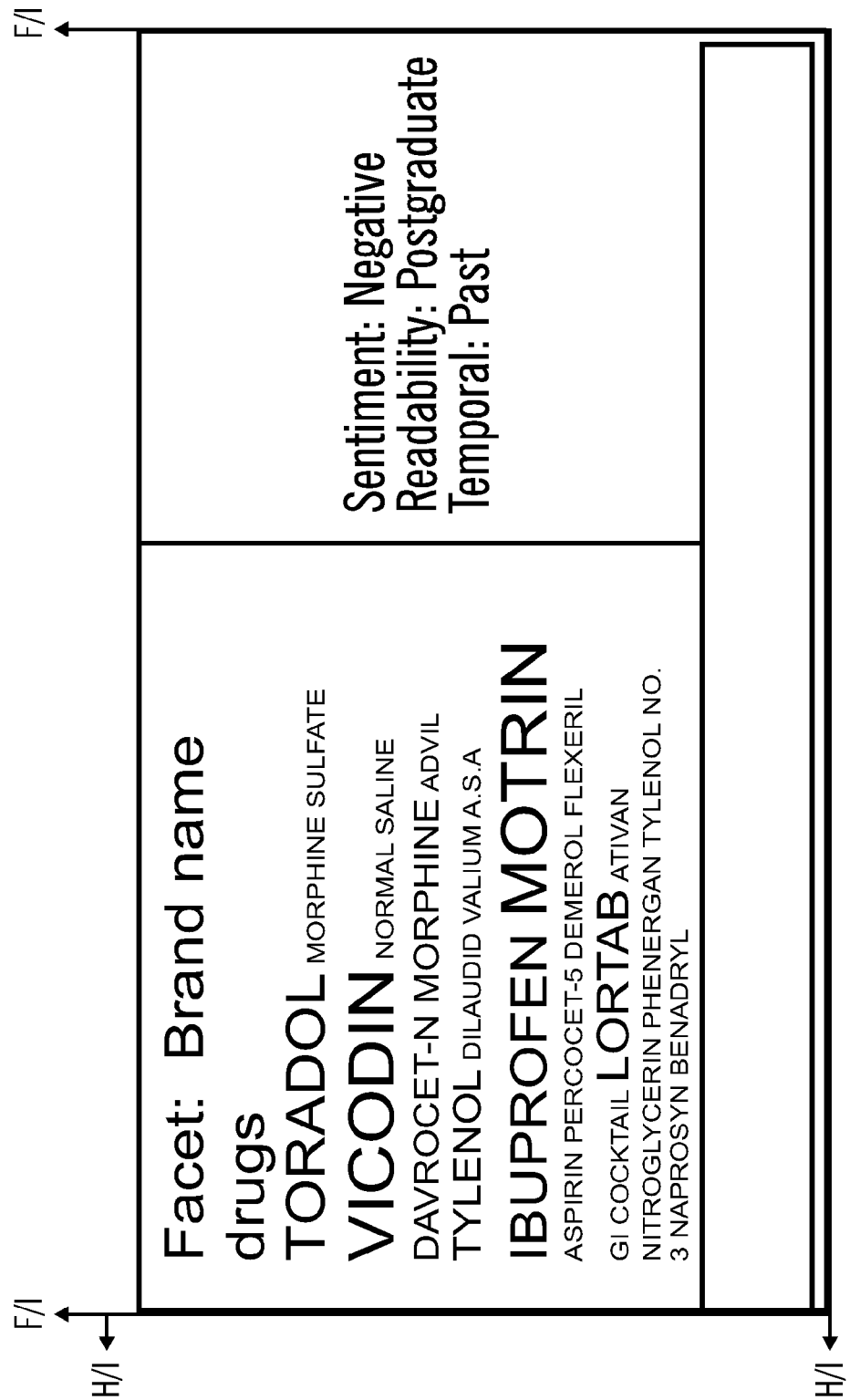
Figure 10A:
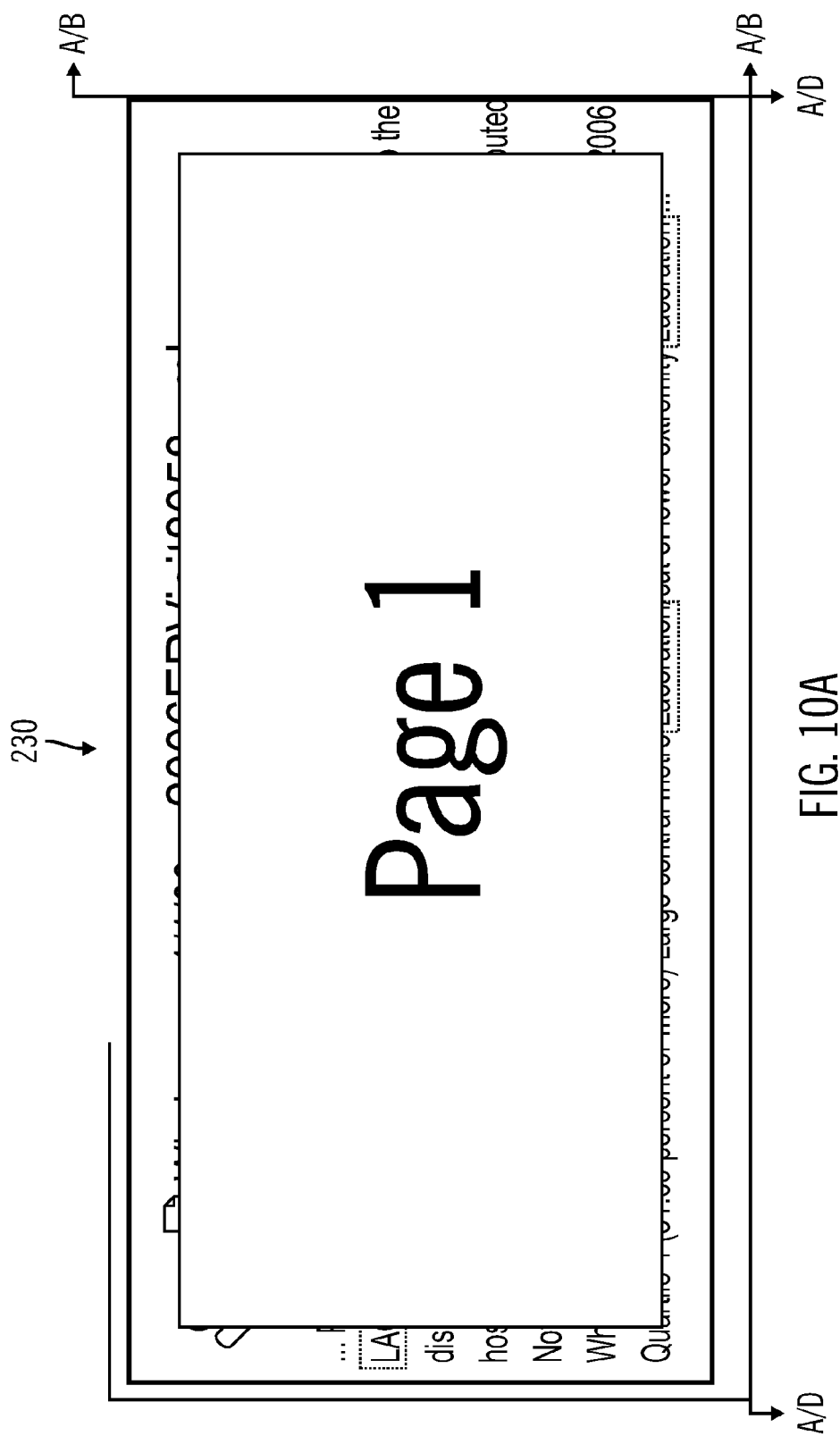
Figure 10B:
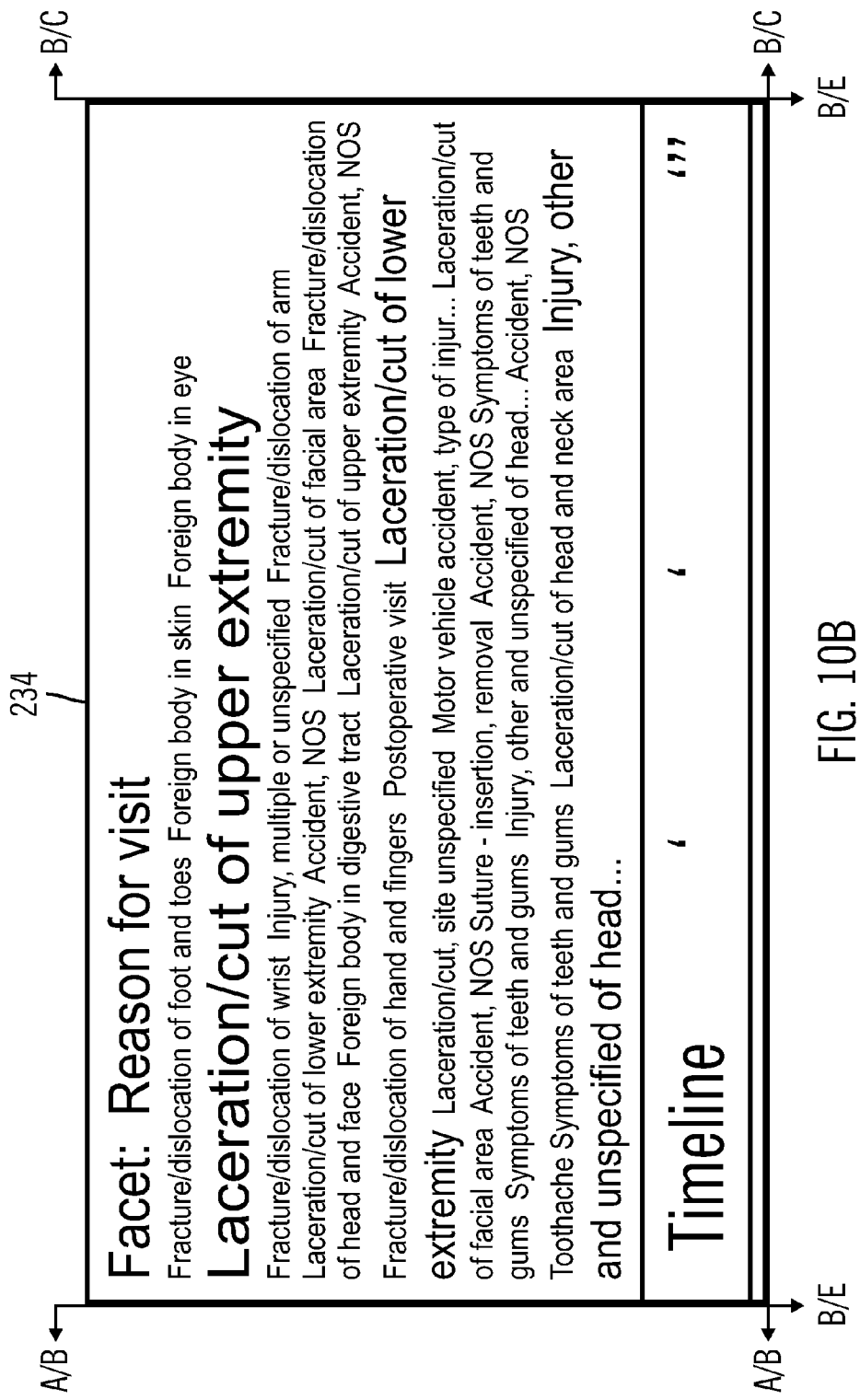
Figure 10C:
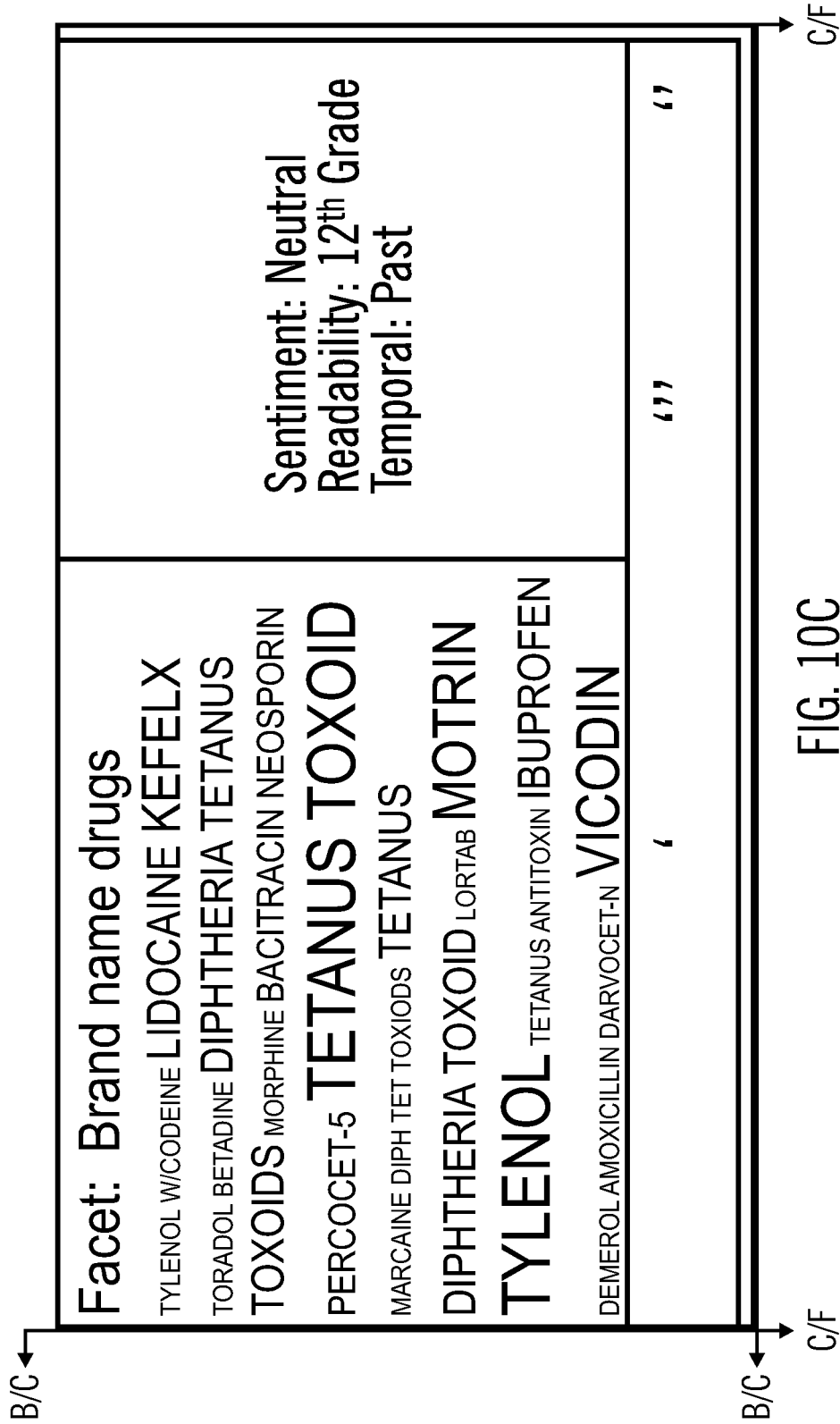
Figure 10D:
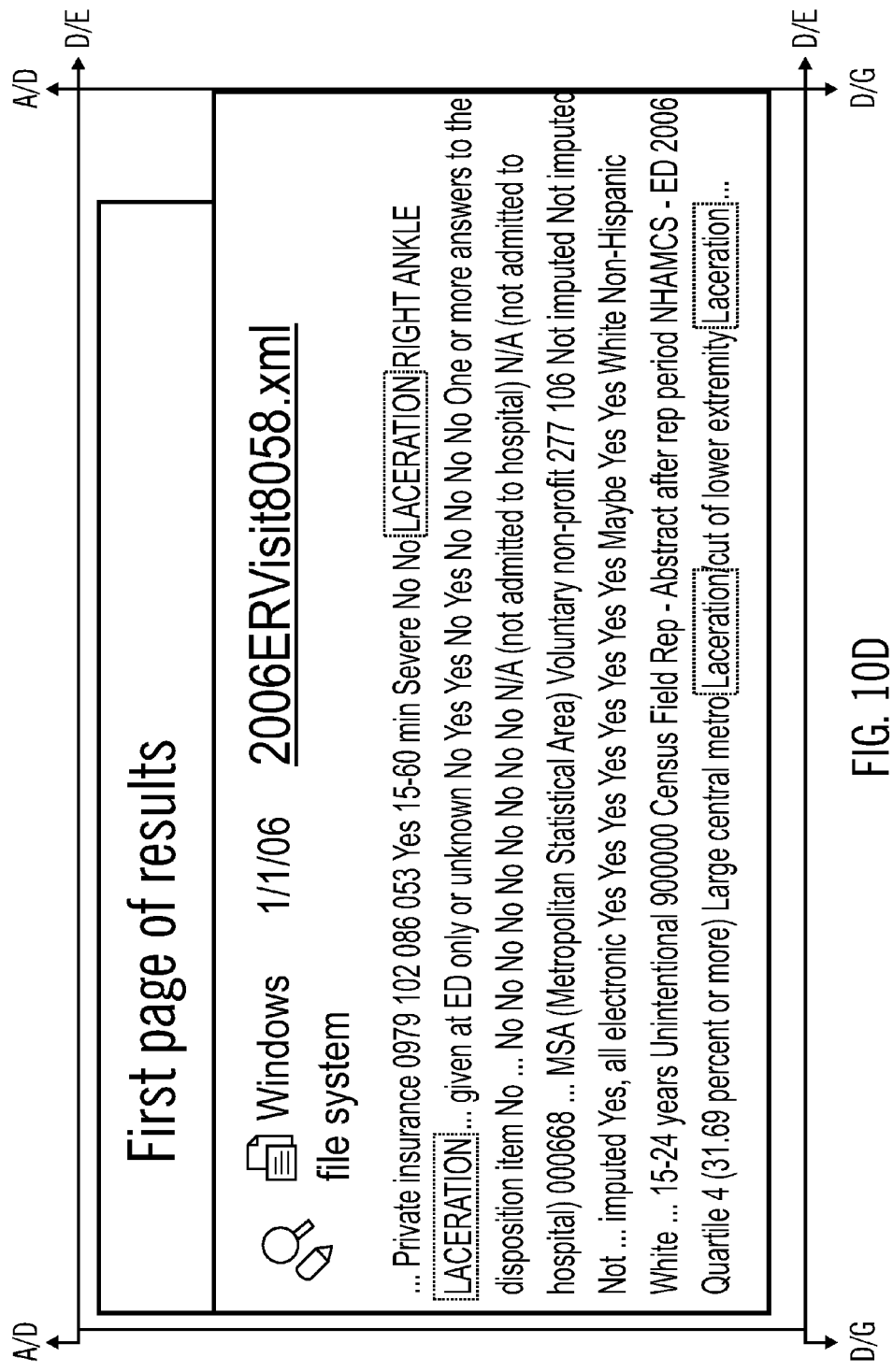
Figure 10E:
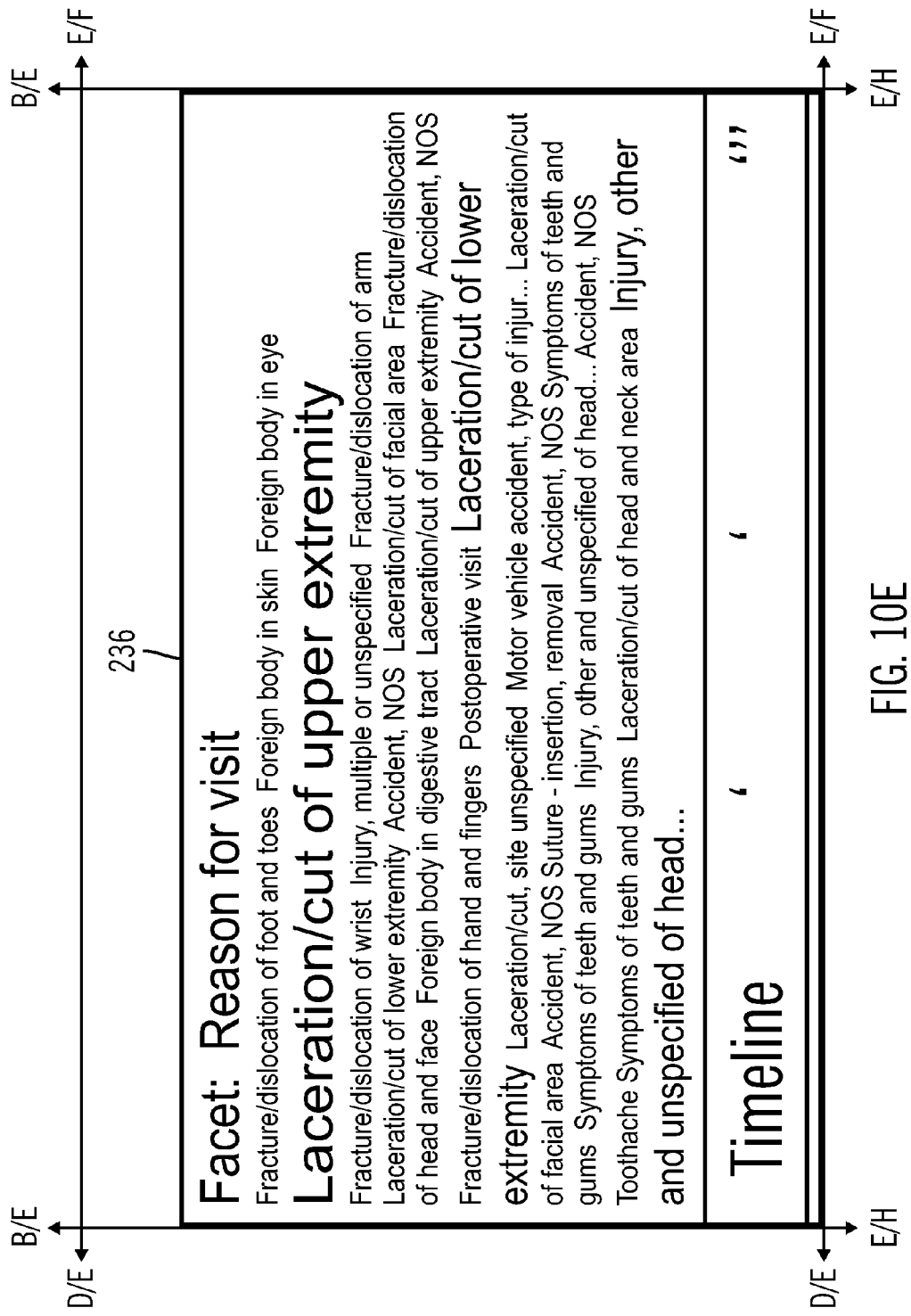
Figure 10F:
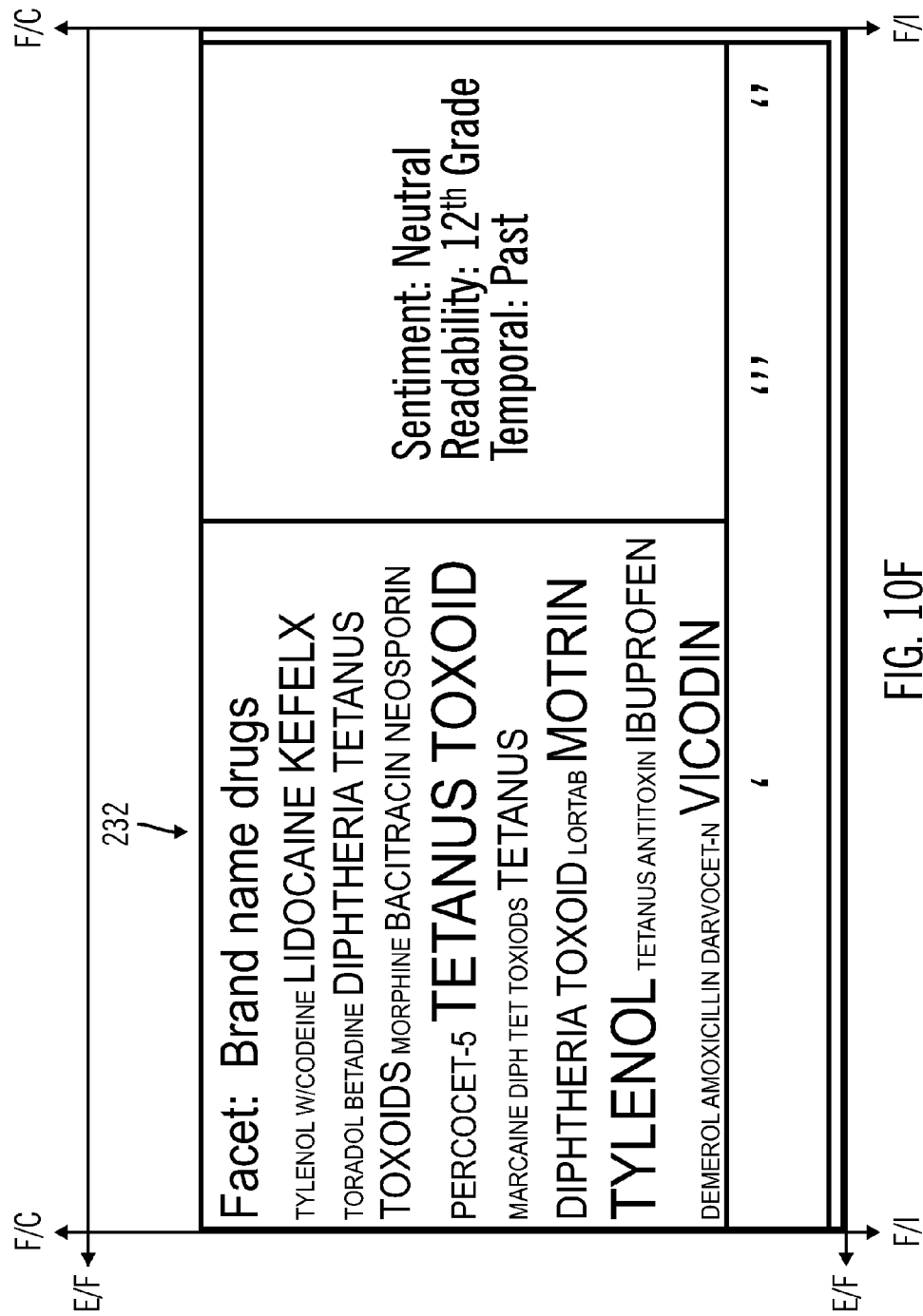
Figure 10G:
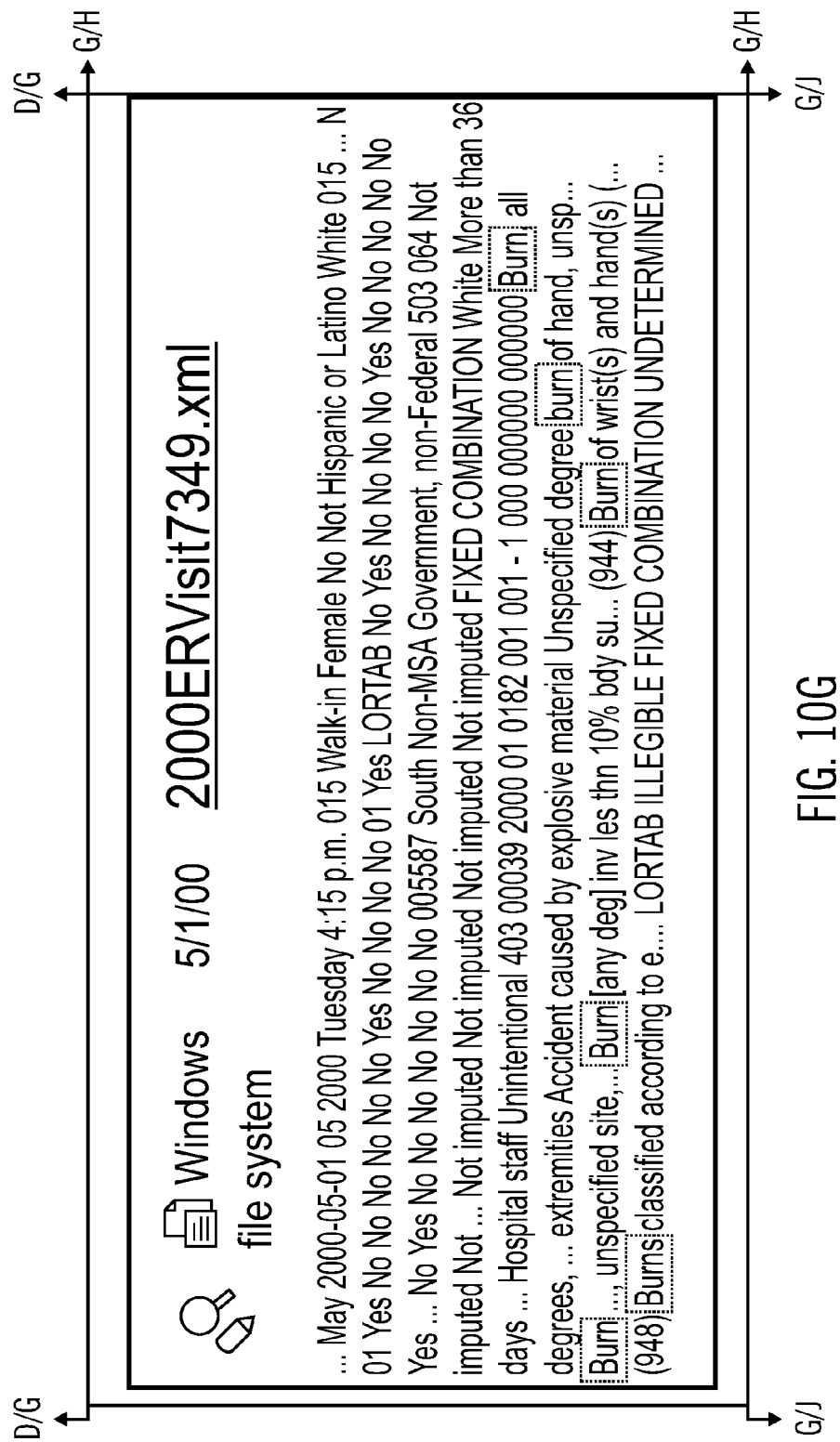
Figure 10H:
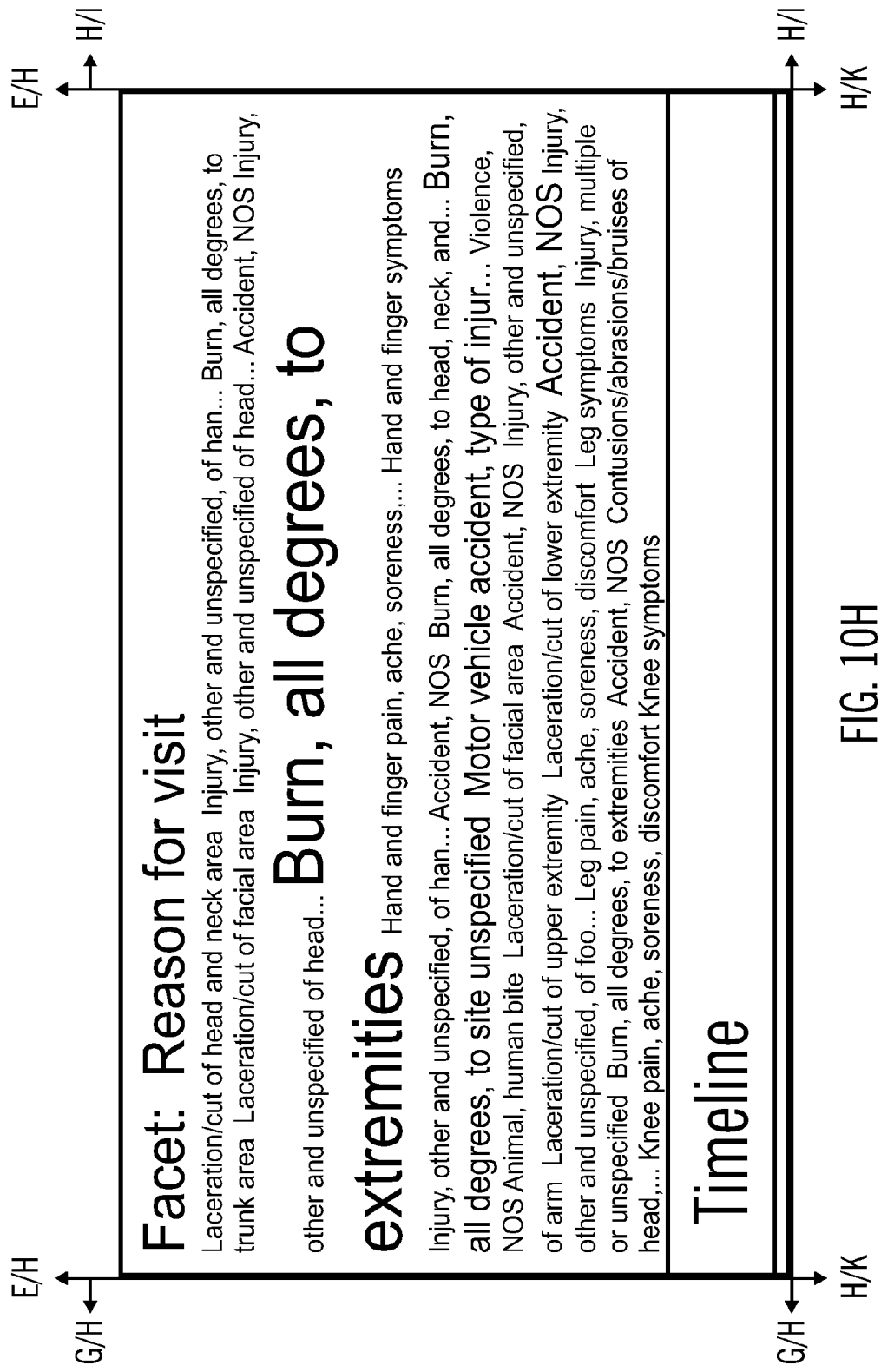
Figure 10I:
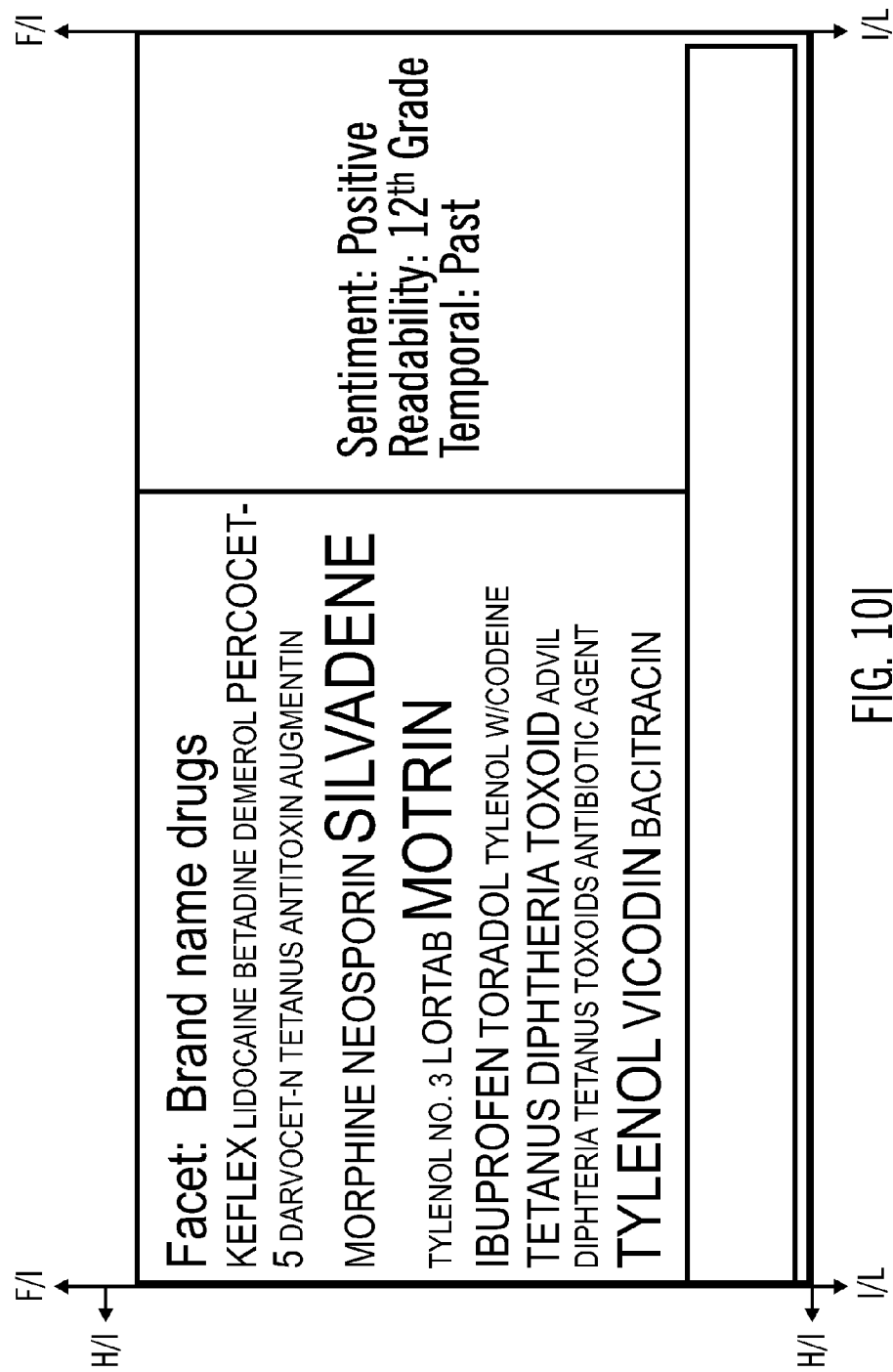
Figure 10J:
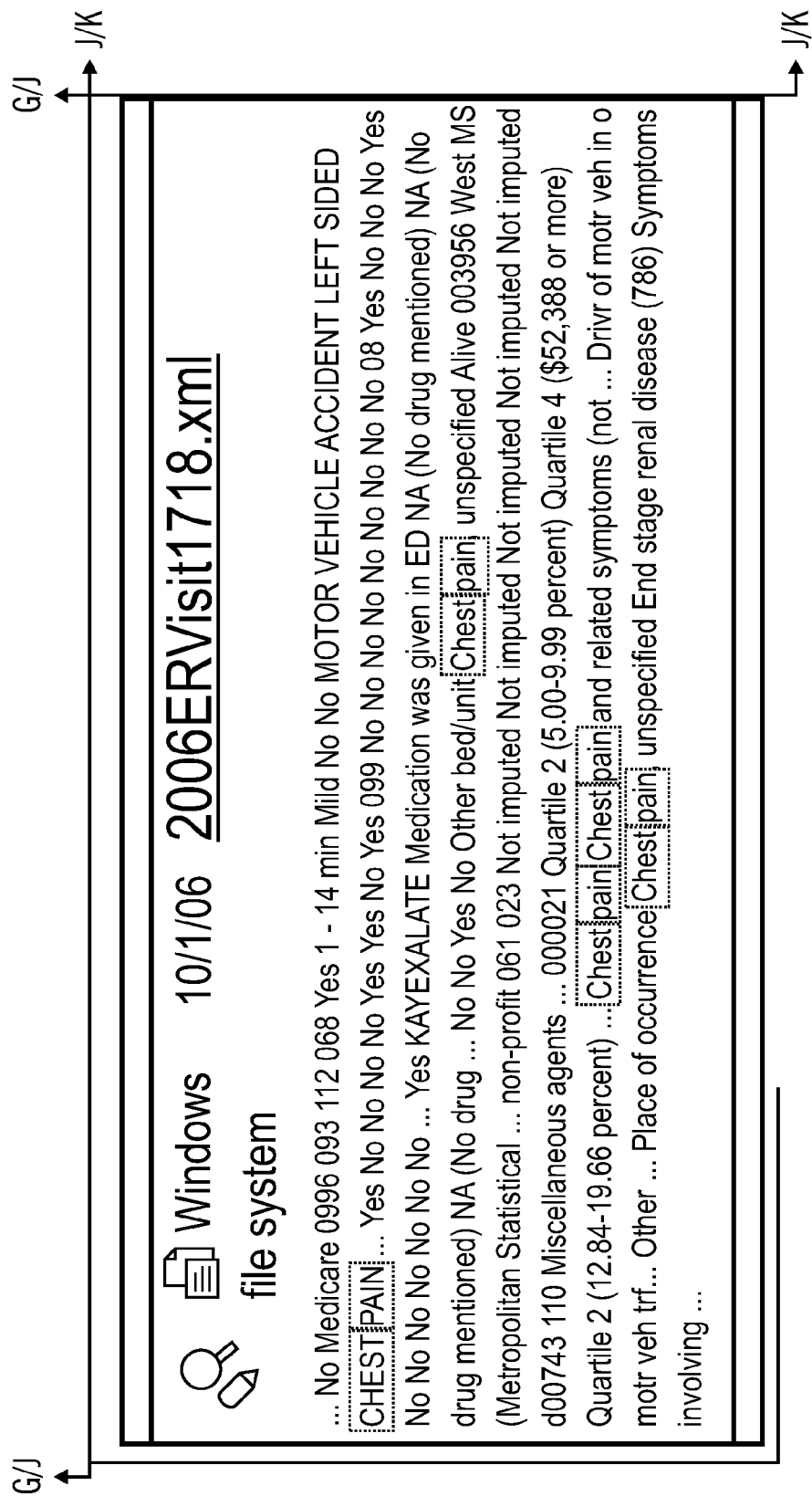
Figure 10K:
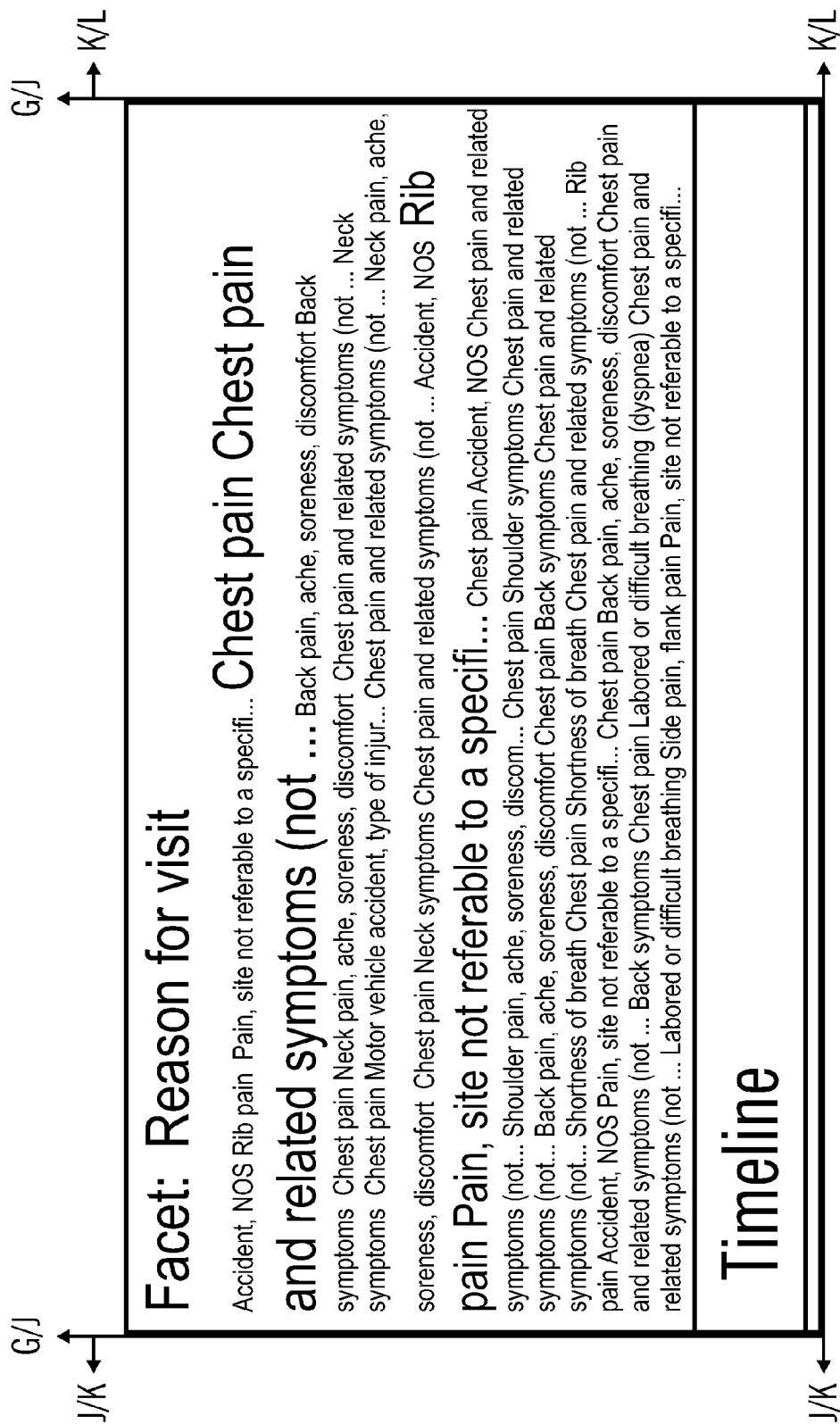
Figure 10L:
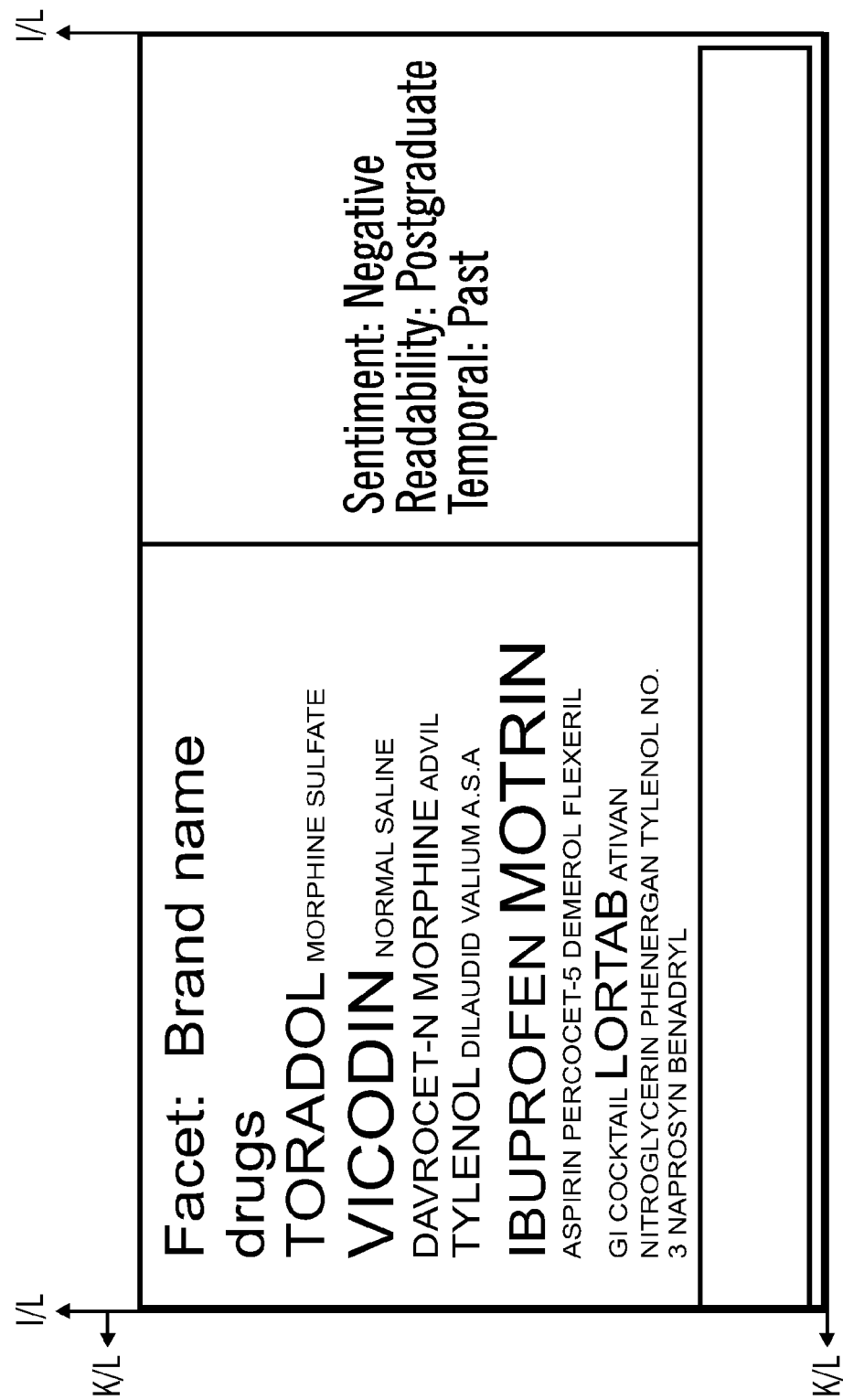

FIG. 8 illustrates an embodiment of operations performed by the object processor 10 and the search processor 18 to generate display groups based on annotations associated with qualifying content instances in the objects 6. Upon initiating the operation to visualize display groups based on annotations, the annotators 14 may perform (at block 182) analytics on the determined objects to determine annotations for the qualifying content instances of the objects. The determination of annotations may be performed with respect to objects having qualifying content instances after determining the qualifying content instances or before receiving the search request, such as during an indexing operation performed with respect to all content in the all the objects 6 in the repository 4. The search processor 18 determines (at block 184) the objects having annotations for each annotation type for which a display group will be generated. For each annotation type for which a display group instance 70 will be generated, the search processor 18 generates (at block 186) tags for the qualifying content instances associated with annotations corresponding to the annotation type to visualize in the display group for that annotation type. The appearance settings of the tags are applied (at block 188) to the tags rendered in the display group for the annotation type to vary the appearance of the tags based on the annotation of the annotation type associated with the qualifying content instance.

FIGS. 9 and 9A through 9I illustrate an example of displaying multiple word clouds in a row for one medical report, comprising the object. FIGS. 9A through 9I provide views of the cloud panels shown in FIG. 9. Multiple rows are displayed to provide word clouds for different reports having content or text satisfying search results. A first word cloud 200 in a row 202 displays dynamic summary of a report (object) based on the query, with search terms highlighted. A second word cloud 204 in the row adjusts appearance based on frequency of the terms satisfying the search results and a third word cloud 206 displays terms based on text analytics for words having a pharmaceutical annotation, indicating words that are pharmaceuticals, with the appearance varying based on the frequency of the pharmaceutical word. A fourth word cloud 208 comprises a timeline of dates mentioned in the report is also displayed for that report. The other two rows display similar word clouds for different medical reports/objects.

Further, word clouds can be generated that aggregate results for multiple objects, so selection of that word cloud displays the word clouds for each of the objects aggregated in the aggregate word cloud. FIGS. 10 and 10A through 10L show aggregate word cloud 230 that aggregates results for multiple of the word clouds for different medical reports 232. FIGS. 10A through 10L provide views of the cloud panels shown in FIG. 10. Selection of aggregate cloud 230 displays a page of results 232 aggregated by the aggregate cloud 230. For instance aggregate cloud 234 aggregates the results for the reasons for visit cloud, such as cloud 236.

Described embodiments provide techniques for generating display groups to provide visualizations of qualifying content instances satisfying a search criteria based on attributes of the qualifying content instances that are used to determine what qualifying content instances appear in the visualization of the display group and the appearance of tags representing the qualifying content instances.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The elements of the computing environment of FIG. 1, including the object processor 10, search processor 18, and display group manager 24 may be implemented in one or more computer systems, such as the computer system 302 shown in FIG. 11. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 316 which generally carry out the functions and/or methodologies of embodiments of the invention as described herein. The components 10, 18, and 24 of the content analytics system 2 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for rendering search results, the computer program product comprising a non-transitory computer readable storage medium having computer readable program code embodied therein that executes to perform operations, the operations comprising:
   receiving a search request having a search criteria to perform with respect to objects having content instances;
   determining the objects having qualifying content instances that satisfy the search criteria;
   determining attribute values of the qualifying content instances for a specified attribute;
   determining appearance settings for the qualifying content instances based on the attribute values, wherein the appearance settings vary based on the attribute values;
   generating tags indicating the content instances and appearance settings for the qualifying content instances, wherein there is a tag for each of the qualifying content instances indicating an attribute value and an appearance setting for a qualifying content instance; and
   generating visualizations of the tags in a display group to provide visualizations of the qualifying content instances in the objects according to the appearance settings, wherein the visualizations of the tags is varied based on the appearance settings.

2. The computer program product of claim 1, wherein each of the visualizations of the tags includes a link to information on the object having a qualifying content instance visualized by the tag.

3. The computer program product of claim 1, wherein the tags are visualized in a word cloud.

4. The computer program product of claim 3, wherein the operations further comprise:
   generating, for each of a plurality of the objects, visualizations of a plurality of word clouds, wherein the word clouds generated for one object provide appearance settings for the tags based on different attributes.

5. The computer program product of claim 1, wherein the specified attribute used to vary the appearance of the tags is a member of a group of attributes consisting of: a frequency of the qualifying content instance in the object; a correlation of the qualifying content instance to the search criteria; a degree to which the qualifying content instance makes the object different from content instances in other objects; a correlation of the qualifying content instance to an aggregation of search requests; and an extent to which the qualifying content instance comprises a proper name.

6. The computer program product of claim 1, wherein generating the visualization comprises displaying for each object:
   a first cloud displaying tags based on a correlation of the qualifying content instances to the search criteria, wherein the appearance settings of the tags vary based on a strength of the correlation of the qualifying content instances to the search criteria;
   a second cloud displaying tags based on a frequency of occurrences of the qualifying content instances in the object, wherein the appearance settings of the tags vary based on the frequency of the occurrences of qualifying content instances in the object; and
   a third cloud including tags of qualifying content instances that make the object different from the qualifying content instances in other of the objects, wherein the appearance settings of the qualifying content instances vary based on a strength of an extent to which the qualifying content instances makes the object different from the other objects having qualifying content instances.

7. The computer program product of claim 1, wherein the operations further comprise:
   performing analytics on the determined objects to determine annotations for the qualifying content instances of the objects; and
   determining the objects having annotations of an annotation type, wherein the specified attribute comprises the annotation type, and wherein the generated tags are for the qualifying content instances having annotation values corresponding to the annotation type, wherein the appearance settings of the tags vary based on the annotation of the annotation type associated with the qualifying content instances.

8. The computer program product of claim 7, wherein the operations further comprise:
   displaying a plurality of word clouds for different annotation types, wherein each of the word clouds is associated with one of the annotation types and displays tags for the qualifying content instances, in at least one of the objects, associated with the annotation of the annotation type of the word cloud.

9. A system, comprising:
   a processor; and
   a computer readable storage medium having computer readable program code executed by the processor to perform operations, the operations comprising:
      receiving a search request having a search criteria to perform with respect to objects having content instances;
      determining the objects having qualifying content instances that satisfy the search criteria;
      determining attribute values of the qualifying content instances for a specified attribute;
      determining appearance settings for the qualifying content instances based on the attribute values, wherein the appearance settings vary based on the attribute values;
      generating tags indicating the qualifying content instances and appearance settings for the content instances, wherein there is a tag for each of the qualifying content instances indicating an attribute value and an appearance setting for a qualifying content instance; and
      generating a visualization of the tags in a display group to provide visualization of the qualifying content instances in the objects according to the appearance settings, wherein visualizations of the tags is varied based on the appearance settings.

10. The system of claim 9, wherein each of the visualizations of the tags includes a link to information on the object having a qualifying content instance visualized by the tag.

11. The computer program product of claim 1, wherein the tags are visualized in a word cloud.

12. The system of claim 9, wherein the operations further comprise:
   generating, for each of a plurality of the objects, visualizations of a plurality of word clouds, wherein the word clouds generated for one object provide appearance settings for the tags based on different attributes.

13. The system of claim 9, wherein the operations further comprise:

performing analytics on the determined objects to determine annotations for the qualifying content instances of the objects; and determining the objects having annotations of an annotation type, wherein the specified attribute comprises the annotation type, and wherein the generated tags are for the qualifying content instances having annotation values corresponding to the annotation type, wherein the appearance settings of the tags vary based on the annotation of the annotation type associated with the qualifying content instances.

14. The system of claim 13, wherein the operations further comprise:

displaying a plurality of word clouds for different annotation types, wherein each of the word clouds is associated with one of the annotation types and displays tags for the qualifying content instances, in at least one of the objects, associated with the annotation of the annotation type of the word cloud.

15. A method for rendering search results in a computer system, comprising:

receiving a search request having a search criteria to perform with respect to objects in a computer readable storage medium having content instances;

determining the objects having qualifying content instances that satisfy the search criteria;

determining attribute values of the qualifying content instances for a specified attribute;

determining appearance settings for the qualifying content instances based on the attribute values, wherein the appearance settings vary based on the attribute values;

generating tags indicating the qualifying content instances and appearance settings for the qualifying content instances, wherein there is a tag for each of the qualifying content instances indicating an attribute value and an appearance setting for an qualifying content instance; and generating a visualization of the tags in a display group to provide visualization of the qualifying content instances in the objects according to the appearance settings, wherein visualizations of the tags is varied based on the appearance settings.

16. The method of claim 15, wherein each of the visualizations of the tags includes a link to information on the object having a qualifying content instance visualized by the tag.

17. The method of claim 15, wherein the tags are visualized in a word cloud.

18. The method of claim 17, further comprise:

generating for each of a plurality of objects visualizations of a plurality of word clouds, wherein the word clouds generated for one object provide appearance settings for the tags based on different attributes.

19. The method of claim 15, wherein generating the visualization comprises displaying for each object:

a first cloud displaying tags based on a correlation of the qualifying content instances to the search criteria, wherein the appearance settings of the tags vary based on a strength of the correlation of the qualifying content instances to the search criteria;

a second cloud displaying tags based on a frequency of an occurrence of the qualifying content instances in the object, wherein the appearance settings of the tags vary based on the frequency of the occurrences of qualifying content instances in the object; and a third cloud including tags of qualifying content instances that make the object different from the qualifying content instances in other of the objects, wherein the appearance settings of the qualifying content instances vary based on a strength of an extent to which the qualifying content instances makes the object different from the other objects having qualifying content instances.

20. The method of claim 15, further comprising:

performing analytics on the determined objects to determine annotations for the qualifying content instances of the objects; and determining the objects having annotations of an annotation type, wherein the specified attribute comprises the annotation type, and wherein the generated tags are for the qualifying content instances having annotation values corresponding to the annotation type, wherein the appearance settings of the tags vary based on the annotation of the annotation type associated with the qualifying content instances.

* * * * *